(12) United States Patent
Lawrence

(10) Patent No.: US 10,853,898 B1
(45) Date of Patent: Dec. 1, 2020

(54) METHOD AND APPARATUS FOR CONTROLLED MESSAGES

(71) Applicant: Mark Lawrence, Monrovia, CA (US)

(72) Inventor: Mark Lawrence, Monrovia, CA (US)

( * ) Notice: Subject to any disclaimer, the term of this patent is extended or adjusted under 35 U.S.C. 154(b) by 960 days.

(21) Appl. No.: 15/375,087

(22) Filed: Dec. 11, 2016

Related U.S. Application Data

(60) Provisional application No. 62/274,247, filed on Jan. 2, 2016.

(51) Int. Cl.
| | | |
|---|---|---|
| *G06Q 50/18* | (2012.01) | |
| *G06Q 20/38* | (2012.01) | |
| *G06Q 20/12* | (2012.01) | |
| *G06Q 20/40* | (2012.01) | |

(52) U.S. Cl.
CPC ....... *G06Q 50/184* (2013.01); *G06Q 20/1235* (2013.01); *G06Q 20/3829* (2013.01); *G06Q 20/40* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 5,031,218 A | * | 7/1991 | Galand | G11B 20/1876 360/32 |
| 7,752,403 B1 | * | 7/2010 | Weinman, Jr. | G06F 21/6227 711/161 |
| 8,359,246 B2 | | 1/2013 | Buchheit | |
| 2003/0040947 A1 | * | 2/2003 | Alie | G06Q 30/06 705/28 |
| 2006/0053079 A1 | | 3/2006 | Edmonson | |
| 2007/0038567 A1 | | 2/2007 | Allaire | |
| 2008/0073007 A1 | * | 3/2008 | Zuesi-Kreuzer | A45C 13/28 150/110 |
| 2011/0022846 A1 | * | 1/2011 | Ginter | G06Q 30/0273 713/176 |
| 2011/0087886 A1 | | 4/2011 | Anderson | |
| 2011/0202756 A1 | * | 8/2011 | West | H04L 51/08 713/152 |
| 2014/0156520 A1 | * | 6/2014 | Kelly | G06Q 20/14 705/40 |

* cited by examiner

*Primary Examiner* — Jay Huang
*Assistant Examiner* — Gabriel Mercado

(57) ABSTRACT

The present invention is a method and apparatus for a first user to create intellectual property, in the form of digital media, then sell it to a second user. Users can collaborate to create intellectual property in an efficient manner by following a preferred procedure. The intellectual property can be distributed in an encrypted form which allows the intellectual property owner to specify the conditions of use that must be met for a specified intellectual property user to use the intellectual property. The user can authenticate the intellectual property in a distributed secure platform before final payment. The intellectual property owner can tag each copy of the intellectual property to trace the source of unauthorized copies.

17 Claims, 15 Drawing Sheets

Data Storage System 207

- 601 CCS Database
- 602 Administration Database
- 603 Owner Database
- 604 User Database
- 605 Authentication Database
- 606 Service Provider Database
- 607 Intellectual Property Database
- 608 Audit Database
- 609 Terms & Conditions Database
- 610 Commitment Database
- 611 Offers Database
- 612 Unique Tag Database
- 613 Transactions Database
- 614 Notification Database
- 615 Encryption Database
- 616 Workflow Management Database
- 617 Intellectual Property Development Database
- 618 Payment Processor Database

Fig. 6

| | |
|---|---|
| 1101 | The system administrator creates a workflow that is the preferred procedure to develop intellectual property, such as music or a video. |
| 1102 | The system administrator modifies the workflow that is the preferred procedure to develop intellectual property. |
| 1103 | The system administrator saves the workflow that is the preferred procedure to develop intellectual property. |
| 1104 | The system administrator activates the workflow that is the preferred procedure to develop intellectual property. |

END

| | |
|---|---|
| 1105 | The intellectual property owner logs into the workflow management system and starts the preferred procedure to develop intellectual property. |
| 1106 | The workflow management system opens the selected procedure to develop intellectual property. |
| 1107 | The workflow management system guides the intellectual property owner through the preferred method to create intellectual property. |
| 1108 | The workflow management system saves the information created at each completed step in the process and also saves drafts for the incomplete steps. |
| 1109 | The workflow management system enables the intellectual property owner to resume the preferred method until the production process is complete. |

END

Fig. 11

METHOD AND APPARATUS FOR CONTROLLED MESSAGES

CROSS REFERENCE TO RELATED APPLICATION

This application claims the benefit of provisional patent application Ser. No. 62/274,247 filed 2016 Jan. 2 by the present inventor.

This application is related to the following commonly-owned United States Patent Applications; Provisional Patent Application 60/140,479 (Jun. 22, 1999), Provisional Patent Application 60/216,767 (Jun. 7, 2000), application Ser. No. 09/599,673 (Jun. 22, 2000), application Ser. No. 10/716,847 (Nov. 18, 2003), Provisional Patent Application 61/315,977 (Mar. 21, 2010), Provisional Patent Application 61/327,720 (Apr. 26, 2010), Provisional Patent Application 61/361,431 (Jul. 5, 2010), patent application Ser. No. 13/046,775 (Mar. 14, 2011), Utility U.S. Pat. No. 8,527,327, Utility U.S. Pat. No. 8,548,868 and Provisional Patent Application 62/152,819 (Apr. 24, 2015), Provisional Patent Application 62/274,247 (Jan. 2, 2016), Provisional Patent Application 62/274,298 (Jan. 3, 2016), Provisional Patent Application 62/295,135 (Feb. 14, 2016), patent application Ser. No. 15/089,553 (Apr. 3, 2016), Provisional Patent Application 62/360,427 (Jul. 10, 2016), patent application Ser. No. 15/268,591 (Sep. 18, 2016), and patent application Ser. No. 15/268,623 (Sep. 18, 2016).

This application is also related to the following commonly-owned International Patent Applications; WO 00/79350 (Dec. 28, 2000), WO 02/05138 (Jan. 17, 2002), and PCT/US00/17247 (Jun. 22, 2000).

The workflow management system taught herein is a part of the present Invention and is a new use of the Process Automation Software taught in application Ser. No. 10/716,747 (Nov. 18, 2003).

The controlled messaging system taught herein is a new use of the aggregate demand system for buyer specified goods and services taught in utility U.S. Pat. No. 8,548,868.

FEDERALLY SPONSORED RESEARCH

None.

SEQUENCE LISTING

None.

BACKGROUND OF THE PRESENT INVENTION

1.1) Field of the Invention

This invention relates generally to the field of making a market for the creation, distribution and controlled use of intellectual property in the form of digital media.

1.2) Background

According to the USTO, the entire U.S. economy relies on some form of Intellectual Property ("IP"), because virtually every industry either produces it or uses it. The USPTO report "Intellectual Property and the U.S. Economy: Industries in Focus" identifies 75 industries (from among 313 total) as IP-intensive. These IP-intensive industries directly accounted for 27.1 million American jobs, or 18.8 percent of all employment in in 2010. Moreover, a substantial share of IP-intensive employment in the United States was in the 60 trademark-intensive industries, with 22.6 million jobs in 2010. The 26 patent-intensive industries accounted for 3.9 million jobs in 2010, while the 13 copyright-intensive industries provided 5.1 million jobs. IP-intensive industries accounted for about $5.06 trillion in value added, or 34.8 percent of U.S. gross domestic product (GDP), in 2010.

Depending on individual circumstances, an intellectual property owner can use patents, trademarks, copyrights and other means such as secrecy to protect their intellectual property. However, digital intellectual property can be easily copied and distributed without the consent of the owner. Given the pervasiveness of the internet and low cost tools and services to copy and distribute digital media, there is a need to provide electronic protection of digital media to help enforce the intellectual property rights of the owner.

A plurality of encryption techniques are available to prevent unauthorized access to digital media. Some of these techniques are discussed herein and incorporated into the present invention. In addition, a plurality of authentication techniques are available to supplement encryption. However, a unique authentication approach is incorporated into the present invention. Moreover, a plurality of distribution techniques are available for digital media. Most of these distribution techniques result in third party control of the intellectual property and little control for the intellectual property owner.

Intellectual property owners deserve an efficient market that gives them almost full control of the distribution and use of their digital intellectual property. It must also protect the intellectual property owner from theft by employees of the intellectual property marketplace and help them to trace the source of unauthorized copies of their intellectual property.

These and other challenges in intellectual property markets are not resolved by the prior art. U.S. Pat. No. 8,359,246 B2 teaches a secondary marketplace that can provide potential consumers with a plurality of previously sold digital media content. US 20110087886 A1 teaches an open system where digital media distribution rights owners (DMDRO) offer their digital media for sale and may simultaneously make an open offer to enter into a distribution agreement with any, or all, interested users (e.g. distributors, websites, individuals, etc.) who agree to terms preset by the DMDRO. US 20060053079 A1 teaches a system for distribution and rights management of digital media files. US 20070038567 A1 teaches a system under which parties present digital content items to end users and receive a request from the other party to permit the other party to present the digital content item to end users.

However, none of these disclosures, or any other prior art, teaches an intellectual property (such as digital media) market where the intellectual property owner can create a team and follow a preferred procedure to create intellectual property, where the intellectual property owner's device can encrypt the intellectual property and the platform cannot decrypt the intellectual property, where the intellectual property owner can tag each copy of the intellectual property to help trace the source of unauthorized copies, where the intellectual property owner can specify and enforce a number of conditions under which the intellectual property user can use the intellectual property, where the intellectual property user can authenticate the intellectual property in a distributed platform, where the intellectual property user can pay the intellectual property owner directly for the intellectual property and the authentication platform cannot decrypt the authentication.

Accordingly, there is a need for an intellectual property market that empowers intellectual property owners to collaborate to create intellectual property while following an efficient preferred procedure, distribute an encrypted form of the intellectual property that only the target intellectual property user can decrypt, enable the intellectual property owner to tag each copy of the intellectual property to track the source of unauthorized copies, enforce specific conditions of use for the intellectual property, enable users to authenticate the intellectual property in a distributed secure platform before final payment and allow payment to be made directly to the intellectual property owner. The applicant is not aware of any other commercially viable system that addresses the shortcomings of the prior art and also includes the features stated above. It is therefore an object of the present invention to set forth a system that offers these capabilities to intellectual property owners and users.

It is also an object of the present invention to enable the intellectual property owner to create a user profile and create symmetric encryption keys, public encryption keys and private encryption keys.

It is an object of the present invention to enable the intellectual property owner to form a team to create intellectual property and for that team to follow a preferred procedure when creating said intellectual property.

It is a further object of the present invention to enable the intellectual property owner to initiate encryption of the intellectual property in a way that only users specified by the intellectual property owner can invoke decryption of the intellectual property.

It is an object of the present invention to enable the intellectual property owner to tag each copy of the intellectual property in order to track the source of unauthorized copies.

It is another object of the present invention to enable the intellectual property owner to specify the terms to unlock the encrypted intellectual property and enforce specific terms of use.

It is an object of the present invention to prevent the marketplace or authentication system from being able to decrypt the intellectual property.

It is another object of the present invention to enable the intellectual property owner to place an offer for sale or use for the intellectual property.

It is another object of the present invention to enable the intellectual property owner to enable some of the offer to be encrypted and some of the offer to be clear (e.g., unencrypted).

It is a further object of the present invention to enable the intellectual property user to invoke decryption of the offer when that user meets the terms and conditions specified by the intellectual property owner.

It is another object of the present invention to enable the intellectual property user to make payments directly to the intellectual property owner.

It is yet another object of the present invention to enable the intellectual property user to invoke decryption of the intellectual property.

It is another object of the present invention to enable the intellectual property user to request authentication of the intellectual property.

It is yet another object of the present invention to enable a distributed authentication authority to authenticate the intellectual property.

It is yet another object of the present invention to enable the intellectual property user to confirm payment for the intellectual property.

It is also an object of the present invention to enable the intellectual property user to use the intellectual property in accordance with the associated terms and conditions of use.

These and other objects of the present invention will be apparent to those skilled in the art from the following detailed description of the present invention, the accompanying drawings and the appended claims.

SUMMARY OF THE PRESENT INVENTION

In a preferred embodiment, the present invention provides a method and apparatus for:

Users to sign-up as a member and create a profile that includes a dedicated symmetric encryption key, a dedicated private encryption key and a dedicated public encryption key.

Intellectual property owners to create intellectual property and store it in an encrypted form in the marketplace.

Intellectual property owners to upload intellectual property and store it in an encrypted form in the marketplace.

Intellectual property owners to specify the terms and conditions for an end user to use the intellectual property.

Intellectual property owners to make an offer to sell the rights to use the intellectual property.

Intellectual property users to make a commitment to procure the rights to use the intellectual property.

Intellectual property owners to tag each copy of the intellectual property to help trace the source of unauthorized copies.

Intellectual property owners to distribute the intellectual property to a committed user.

Intellectual property users to meet the conditions to receive the intellectual property.

Intellectual property users to authenticate the intellectual property.

Intellectual property users to pay the intellectual property owner for the intellectual property.

Intellectual property users to use the intellectual property in accordance with the terms and conditions of use.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 illustrates a first embodiment of the data storage system ("DSS") for the present invention.

FIG. 11 illustrates a first embodiment of the workflow procedure for the workflow management system ('WMS') of the present invention.

DETAILED DESCRIPTION OF THE INVENTION

With reference to the figures, exemplary diagrams of key components of the present invention are provided in which illustrative embodiments may be implemented. It should be appreciated that these figures are only exemplary and are not intended to assert or imply any limitation with regard to the components in which different embodiments may be implemented. Many modifications to the depicted components may be made.

System Overview

Figure 1:
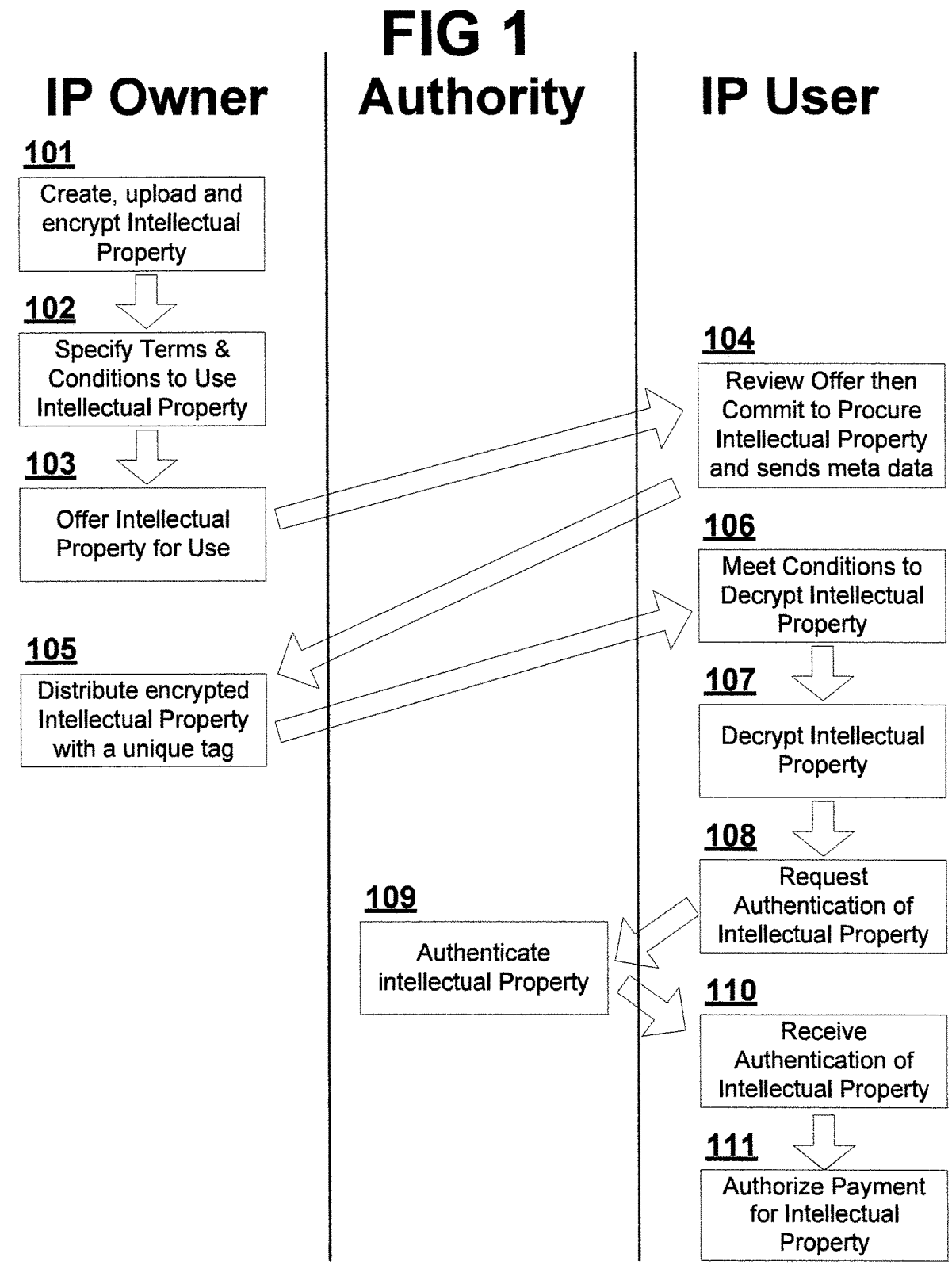
FIG. 1 illustrates a first embodiment of an overview of the present invention.

In an overview of the first embodiment illustrated in FIG. 1, the present invention provides a method and apparatus for owners of intellectual property to specify and enforce the terms and conditions of use for their intellectual property in the form of digital media. Only the intellectual property user specified by the intellectual property owner can decrypt the intellectual property. The intellectual property user can authenticate the intellectual property prior to consummating the transaction. The intellectual property owner can add a unique tag to each copy of the intellectual property to identify the source of any unauthorized usage.

The present invention enables an intellectual property owner to create, upload and encrypt intellectual property 101.

The intellectual property owner then specifies the terms and conditions to use the intellectual property 102, such as limiting the use for a duration of time or in a geographic location or on a specific device or for a number of interactions or only when a specific code is entered or only at a specific time of day or only if a biometric key is used.

The intellectual property owner then distributes an offer to use the intellectual property that includes the terms and conditions for use 103.

The intellectual property user reviews the offer for use and the corresponding terms and conditions for use then commits to procure the intellectual property 104. The intellectual property user sends meta data to the intellectual property owner with the purchase commitment. The intellectual property owner requires this meta data to enforce the terms and conditions of use. For example, if the intellectual property owner wants to limit the use to a single device then the intellectual property user must send to the intellectual property owner a unique device identifier, such as the MAC address. The intellectual property owner will encode this MAC address into the terms of use for the copy of the intellectual property that is shipped to the intellectual property user.

The intellectual property owner receives the commitment then distributes the encrypted intellectual property to the committed intellectual property user 105. This copy of the intellectual property includes a unique tag that helps trace the source of any unauthorized copies of the intellectual property. It also includes the specification of the terms and conditions of use. For example, if use is only permitted on a specific device then the unique device identifier, such as a MAC address, is encoded into the conditions of use.

The intellectual property user meets the conditions to decrypt the intellectual property 106. For example, the intellectual property user will have to use a specific device to decrypt the intellectual property in cases where the intellectual property owner limits use by that user to one device.

The intellectual property user decrypts the intellectual property 107. The decryption is actually performed by the present invention on the intellectual property user's device.

The intellectual property user submits an authentication request to a distributed authentication service 108. For example, if the intellectual property owner is a reseller then the intellectual property user can validate the authenticity of the copy received with the distributed authentication service.

The intellectual property authentication service validates the authenticity of the of the copy of the intellectual property 109.

The intellectual property user receives the authentication from the intellectual property authentication service 110.

The intellectual property user authorizes payment for the intellectual property 111.

System Context

Figure 2:
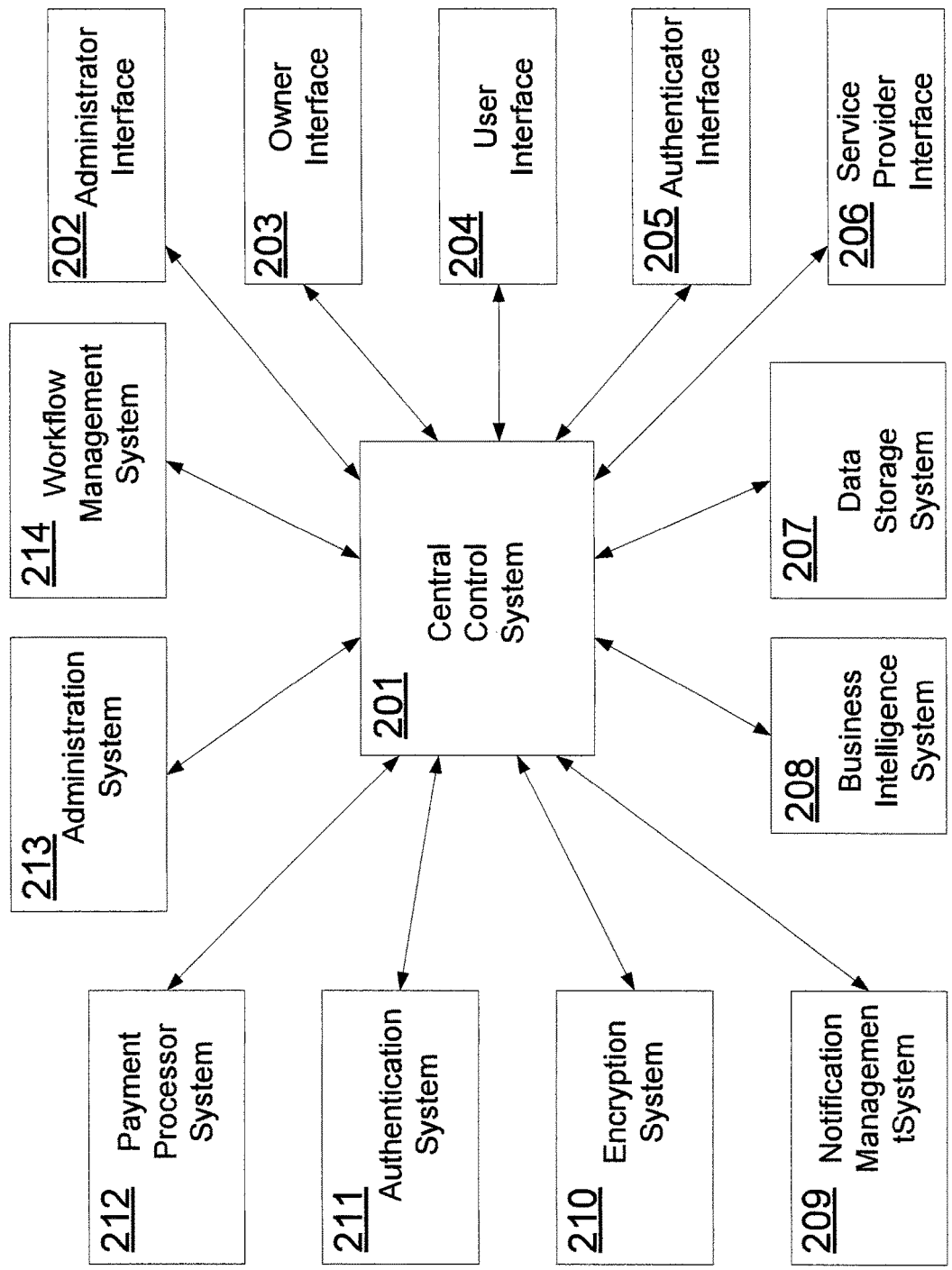
FIG. 2 illustrates a first embodiment of the system architecture of the present invention.

FIG. 2 illustrates the system context of a first embodiment of the apparatus and method of the present invention.

The central control system ("CCS") 201 is operatively coupled to a plurality of other systems and user interfaces. Operative coupling is the preferred procedure to exchange information between systems. In the present invention, the systems are inter-connected via a combination of wide area networks including the public switched telephone network, local area networks, such as an Ethernet network, token ring networks and wireless networks. Most systems, such as modern computers, include a built in interface to a local network, such as an Ethernet or 802.11b wireless network. The communications protocol used by these networks follow an international standard, such as 802.11b, that enables these systems to exchange data using a pre-determined method. However, local area network connectivity only ensures the integrity of data transfer. It is also necessary to specify the information to transfer, its source location and its intended location in the destination system. Each system has its key information stored in pre-determined locations in its database. When the installation engineers configure the interface between two systems they specify the pre-determined location of the required information in the source system's database and the pre-determined location for that information in the destination system's database. The engineers also specify the pre-determined frequency of information transfer (e.g., continuous, every day at 10:00 PM PT), the pre-determined format to use (e.g., synchronous, flat file Extract Transform Load "ETL") and the pre-determined error checking protocol to use. The combination of network connectivity and the configuration of the communication method by installation engineers enable systems to be operatively coupled to the CCS.

The user interfaces are operatively coupled to the CCS 201. The different types of users access the CCS through a plurality of user interfaces. The user interfaces include the system administrator interface 202, the intellectual property owner interface 203, the intellectual property user interface 204, the intellectual property authenticator interface 205 and the service provider interface 206 (collectively "the user interfaces"). The user interfaces are the input and output gateways for communications with the CCS 201.

The data storage system 207 is operatively coupled to the CCS. The data storage system stores the plurality of data used by the present invention.

The business intelligence system 208 is operatively coupled to the CCS. The business intelligence system calculates and stores a plurality of information about trends, patterns and relationships in the databases used by the present invention.

The notification management system 209 is operatively coupled to the CCS. The CCS sends an alert to the notification management system whenever an event occurs that requires the attention of a user or other entity. For example, after an offer or commitment has been received that meets a predetermined set of criteria then the CCS will instruct the notification management system to alert the relevant user by sending an email, text message or alternative notification.

The encryption system 210 is operatively coupled to the CCS. The encryption system enables a symmetric encryption key, public encryption key and private encryption key to be generated for each user. It also enables the users to update these keys with replacements on demand. The encryption system also provides an algorithm that is used to encrypt and decrypt intellectual property. It supports a multitude of encryption techniques including symmetric encryption that uses the same key to encrypt and decrypt intellectual property as well as asymmetric encryption that uses a public encryption key to encrypt information and a private encryption key to decrypt the same information.

The authentication system 211 is operatively coupled to the CCS. The authentication system enables a user to authenticate whether the intellectual property is genuine. For example, the intellectual property owner can register the intellectual property with the authentication system. This enables the intellectual property user to purchase rights to use the intellectual property from a reseller then verify the authenticity of the intellectual property with the authentication system prior to completing the payment process.

The payment processor system 212 is operatively coupled to the CCS. The payment processor system enables payments to be escrowed and transferred from the intellectual property user to the intellectual property owner with fees being transferred to the operator of the present invention and to third party service providers, such as intellectual property resellers. A number of service providers offer payment processor systems that can be used by the present invention, such as WePay and Stripe.

The administration system 213 is operatively coupled to the CCS. The administration system enables a user to administer the CCS. For example, the system administrator can use the administration system to update the look, feel and content of the web and mobile interfaces. The administration function also provides forum services that support community discussions and enables technical support and maintenance functions for the present invention.

The workflow management system 214 is operatively coupled to the CCS. The workflow management system enables an intellectual property owner to create intellectual property, such as music, videos, software and electronic games. The workflow management system also enables an intellectual property owner to upload intellectual property to the data storage system. The workflow management system also enables multiple intellectual property owners to collaborate to create intellectual property.

Figure 3:
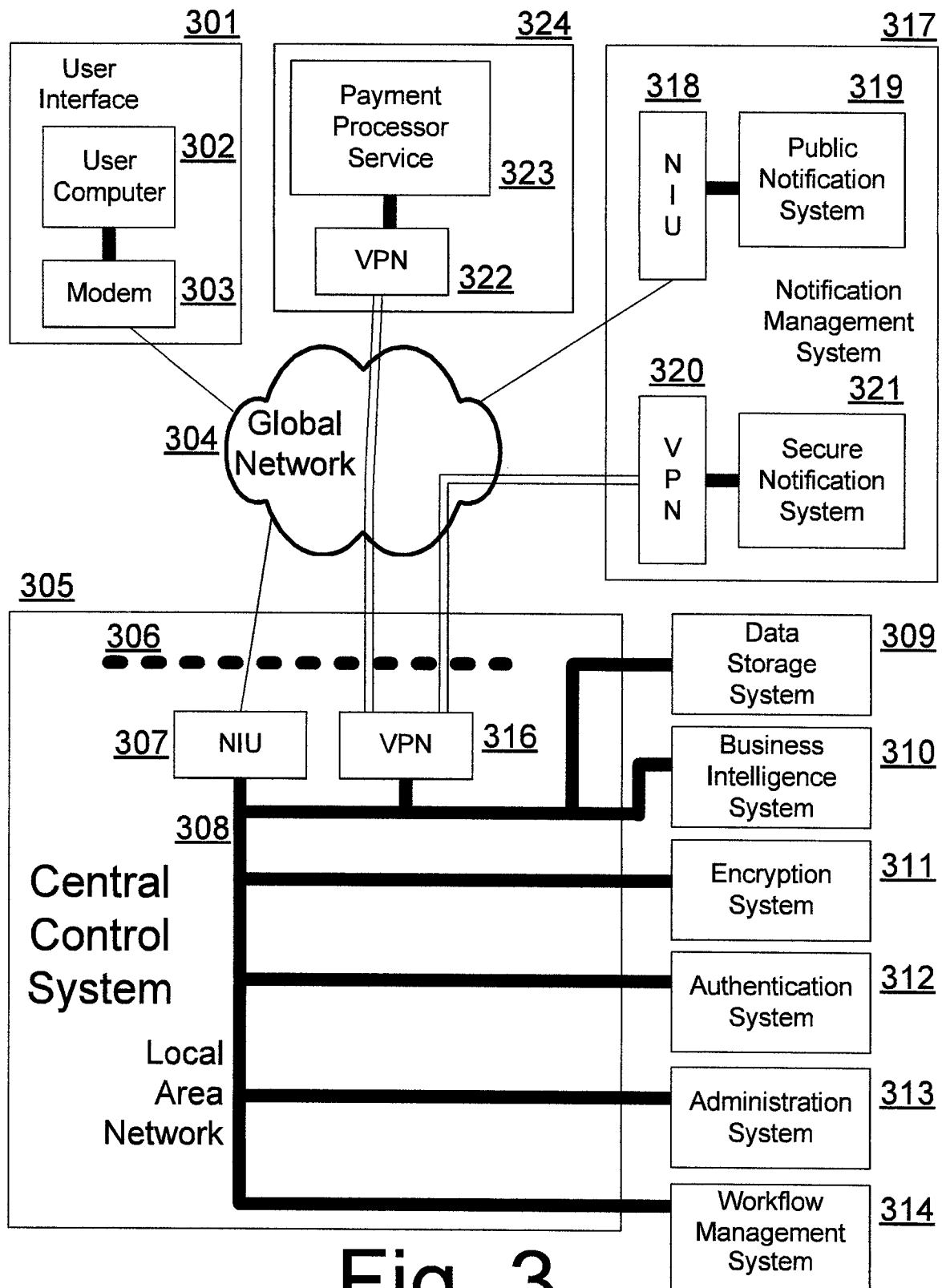
FIG. 3 illustrates a first embodiment of the integration among the central control system and key components of the present invention.

FIG. 3 illustrates the network connectivity of a first embodiment of the apparatus and method of the present invention.

The user interfaces 301 include a computer 302 and a modem 303. Many companies make mobile and desktop computers that a user can use to access the CCS including Apple, Samsung, Hewlett Packard, and Toshiba. In addition, many companies make modems that can connect to the CCS including 3Com Corp., D-Link Systems, Inc., and US Robotics. The user's computer is connected to the CCS via the modem and a Global Network 304, such as the Internet. The user's modem can be connected to the Global Network using at least one of a plurality of services including public or private networks such as the public switched telephone network, dedicated data line, cable service, cellular service, WiFi service, personal communication system ("PCS"), satellite network, and a microwave connection. These types of connections are provided by a plurality of organizations including local and regional telephone operating companies, cable TV companies and other providers of private and public networks.

The CCS 305 includes a local area network 308 that is connected to the global network 304 via a network interface unit ("NIU") 307 and a firewall 306. The CCS is also connected to other systems via the local area network 308 including the Data Storage System 309, Business Intelligence System 310, Encryption System 311, Authentication System 312, Administration System 313, and the Workflow Management System 314.

The CCS 305 also includes a Virtual Private Network ("VPN") modem 316 that is connected to the Secure Notification System 321 and the Payment Processor System 323. Many companies make VPN modems that can be used with the present invention including Netgear, Linksys and Cisco. The Secure Notification System 321 is connected to the CCS via the Global Network using a Virtual Private Network modem 320. In addition to the Secure Notification System 321, the Notification Management System 317 includes a Public Notification System 319. The Public Notification System 319 is connected to the Global Network using a Network Interface Unit 318. The preferred embodiment of the present invention can use a plurality of Public Notification Systems including email services and mobile services. The present invention can operate with many such email services including Yahoo, Hotmail and Gmail. Many organizations provide such email services including Yahoo, Microsoft and Google. The Payment Processor System 324 includes a Payment Processor Service 323 that is connected to the Global Network via a VPN modem 322. Many organizations provide such Payment Processor Services that can be used with the present invention including Paypal, Western Union, WePay, Stripe and Verisign.

Figure 4:
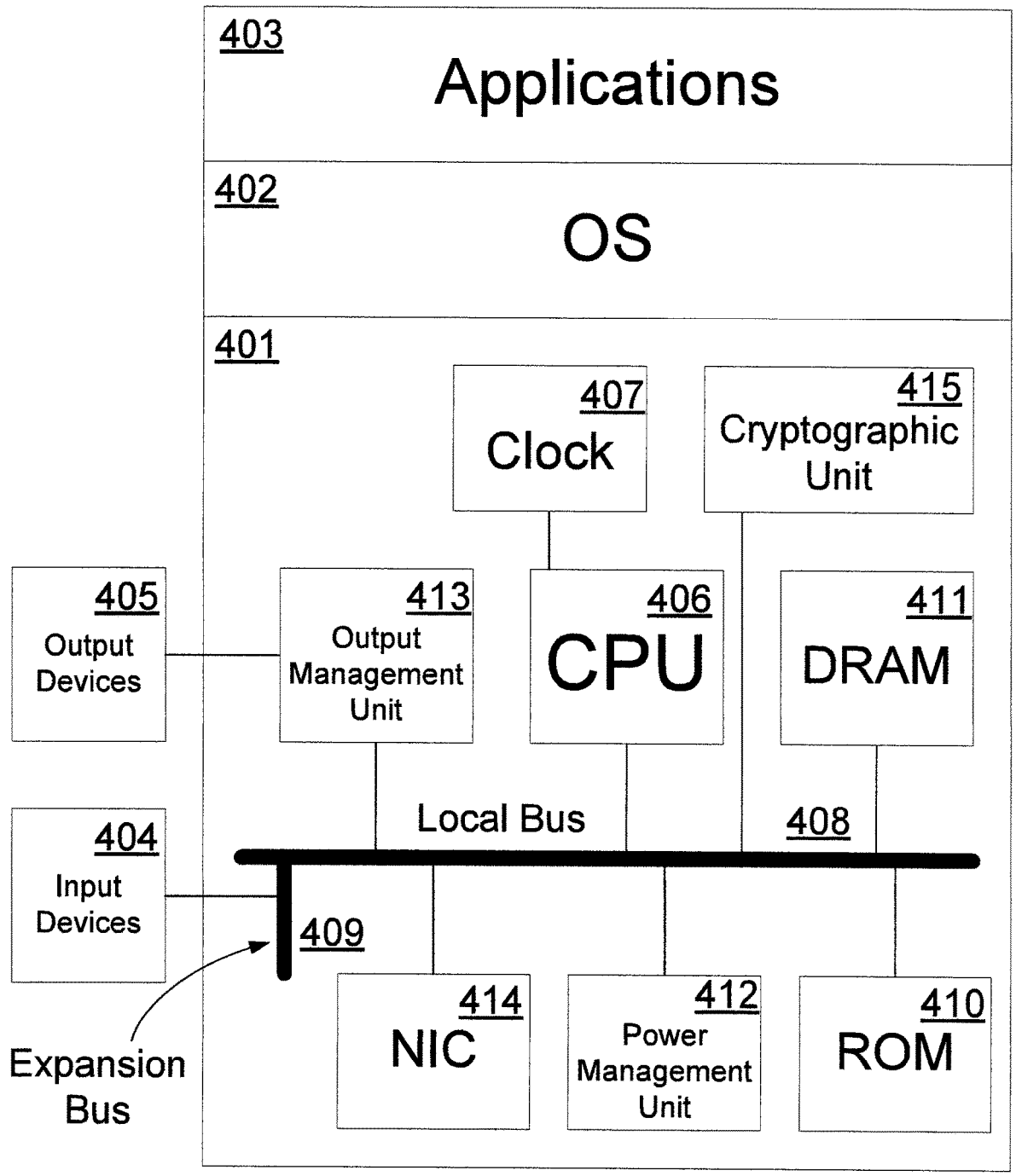
FIG. 4 illustrates a first embodiment of the technical platform for the central control system of the present invention.

FIG. 4 illustrates the key components of the CCS in a first embodiment of the apparatus and method of the present invention.

The Central Control System ("CCS") includes a number of key components including the main hardware 401, the operating system 402, software applications 403, input devices 404 and output devices 405. The operating system 402 is the interface between the applications and the hardware. It controls the execution of computer applications and provides services to those applications. The preferred embodiment of the present invention can use one of a plurality of standard commercial operating systems, such as Microsoft windows, Linux and UNIX. The applications 403 include software tools such as commercial anti virus software available from companies such as McAfee and Norton, and a browser, such as Microsoft Internet Explorer, Chrome and Firefox. The CCS also includes some unique code that implements some of its unique functions described in this disclosure, such as coordinating data interchange among the different systems illustrated in FIG. 2. This unique code can be programmed using one or more standard programming languages including Java, javascript, PHP, HTML, C, C+, and visual basic. Input devices 404 include a plurality of commercial options such as a smartphone, keyboard, a camera, a mouse, and a microphone. Output devices 405 include a plurality of commercial options such as a smartphone, monitor and speakers. These standard commercial input devices 404 and output devices 405 are available from a plurality of vendors such as CompUSA and Office Depot.

The main hardware 401 in the CCS can be a conventional smartphone or personal computer or a conventional server with sufficient memory and processing power. To one skilled in the art, it will be evident that the functionality of the CCS can be distributed over multiple inter-connected smartphones, multiple inter-connected personal computers or multiple inter-connected servers. The main hardware includes a number of key components including the central processing unit ("CPU") 406, clock 407, local bus 408, expansion bus 409, read only memory ("ROM") 410, dynamic random access memory ("DRAM") 411, power management unit 412, output management unit 413, network interface card 414 and cryptographic unit 415.

The central processing unit ("CPU") 406 is the component of the CCS that performs most of the data processing. It interprets instructions, performs logical and arithmetic operations on data, and controls input and output functions. The preferred embodiment of the present invention can use a commercial CPU from a plurality of vendors, such as a Pentium G3258 supplied by Intel and the FX-9590 supplied by AMD. The clock 407 regulates the rate at which the CPU processes instructions. The CCS also uses the clock to synchronize the operation of its key components. A CPU such as a Pentium G3258 can operate at a clock speed of 3.2 GHz. The CCS uses the local bus 408 to inter-connect its key components. These key components exchange data via the local bus. The CCS uses the expansion bus 409 to enable expansion cards to exchange data with the CPU and memory. Examples of commercial expansion cards are sound cards and graphics cards. The expansion bus also enables input devices 404, such as a mouse, to input data that can be used by the key components of the CCS. The read only memory ("ROM") 410 includes the instructions that the CPU executes to perform its basic operations. The vendor of the computer platform that comprises the hardware component of the CCS provides the instructions that are stored in the ROM. When the CCS's power is removed then restored, the instructions in the ROM remain unchanged. The dynamic random access memory ("DRAM") 411 includes instructions that the CPU executes to perform selected tasks. The DRAM also stores the data that is used by the instructions executed by the CPU. When the CCS's power is removed then restored, the information in the DRAM is lost. The CCS uses the power management unit 412 to supply and regulate the power required to operate the key components of the CCS. The CCS uses the output management unit 413 to interface with output devices, such as a monitor. The CCS uses the network interface card ("NIC") 414 to interface with external networks, including an Ethernet network, public switched telephone network and a wireless network. The CCS uses the cryptographic unit 415 to support secure communications with external systems, such as the payment processor system and secure notification management system. The vendor of the computer platform, which is used by the CCS, provides the local bus, expansion bus, ROM, DRAM, power management unit, output management unit, network interface card, clock, CPU and cryptographic unit. Specific components, including the NIC, can be obtained from alternate commercial vendors including CompUSA and Office Depot.

Figure 5:
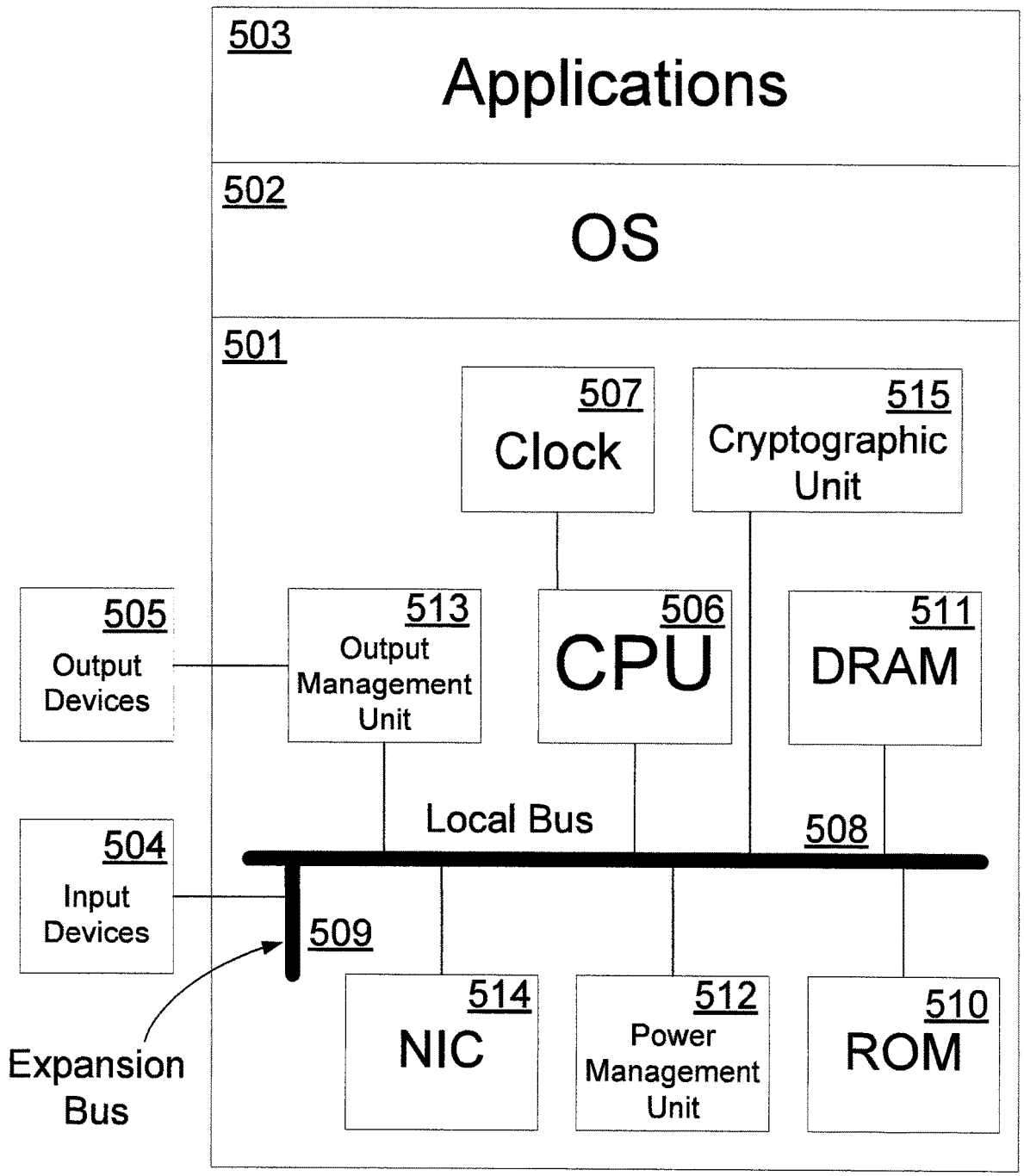
FIG. 5 illustrates a first embodiment of the user interface to the present invention.

FIG. 5 illustrates the key components of the user interface in a first embodiment of the apparatus and method of the present invention.

In a preferred embodiment of the present invention the user interface device 301 is a conventional personal computer that includes, the main hardware 501, the operating system 502, software applications 503, input devices 504 and output devices 505. The main hardware 501 in the user interface device includes a number of key components including the central processing unit ("CPU") 506, clock 507, local bus 508, expansion bus 509, read only memory ("ROM") 510, dynamic random access memory ("DRAM") 511, power management unit 512, output management unit 513, network interface card ("NIC") 514 and cryptographic unit 515. These components are substantially the same as the similarly named components in the CCS as illustrated in FIG. 4. They also perform substantially the same functions and are available from the same vendors. The key differences are that the components in the CCS have higher performance requirements than the equivalent components in the user interface device. In addition, the user interface device includes, commercial software applications such as a word processor application and graphical design application. An example of a word processor application that can be used by the present invention is Microsoft Word. An example of a graphical design application that can be used by the present invention is Microsoft Visio. Examples of higher performance components for the CCS are a faster clock speed, a more powerful CPU and higher capacity DRAM.

FIG. 6 illustrates the key components of the Data Storage System in a first embodiment of the apparatus and method of the present invention.

The data storage system 207 is a conventional hard disk drive that includes non-volatile, magnetic-based hard disk storage that stores digitally encoded data. The data is retained in the data storage system after power is removed then restored. A plurality of suppliers manufacture data storage systems that can be used by the present invention including EMC, Western Digital, Seagate, Maxtor, and Hitachi. The data storage system is comprised of a plurality of databases that are described below. The present invention can use one of a plurality of database systems to house the databases including Oracle and SQL database systems. The CCS stores the data in the Data Storage System in an encrypted format.

The CCS uses the CCS database 601 to store information about how users are using the CCS. The CCS database contains a plurality of fields including a unique reference key for each record in the CCS database, the unique reference key of each user who has logged into the CCS and tracking information about the functions of the CCS used by each user during each login session.

The CCS uses the administration database 602 to store information about the website, the mobile website, and the mobile application for the CCS as well as information about the maintenance and support of the CCS. The administration database contains a plurality of fields including a unique reference key for each record in the administration database, the type of information, the actual information, and corresponding meta data.

The CCS uses the owner database 603 to store information about intellectual property owners. For each intellectual property owner, the owner database contains a plurality of fields including a unique reference key for each record in the owner database, the owner's identifier or name, location, contact phone numbers, email address, login credentials for the CCS and information about the symmetric encryption key, public encryption key, and private encryption key. This information does not give the CCS access to the actual encryption keys.

The CCS uses the user database 604 to store information about intellectual property users. For each intellectual property user, the user database contains a plurality of fields that include a unique reference key for each record in the user database, the user's identifier or name, location, contact phone numbers, email address, login credentials for the CCS and information about the symmetric encryption key, public encryption key, and private encryption key. This information does not give the CCS access to the actual encryption keys.

The CCS uses the authentication database 605 to store information about authentication requests. The authentication database contains a plurality of fields including a unique reference key for each authentication request, the corresponding intellectual property owner, the corresponding the intellectual property user, the authentication information, and the outcome of each request.

The CCS uses the service provider database 606 to store information about service providers. For each service provider, the service provider database contains a plurality of fields that include a unique reference key for each record in the service provider database, the service provider's unique identifier or name, location, contact phone numbers, email address, login credentials for the CCS and information about the symmetric encryption key, public encryption key, and private encryption key. This information does not give the CCS access to the actual encryption keys.

The CCS uses the intellectual property database 607 to store information about intellectual property, such as music, videos and other digital media. The intellectual property database contains a plurality of fields including a unique reference key for each record in the intellectual property database, the type of the intellectual property, the format, the size, the date and time created, the last date and time updated, the intellectual property owner, each intellectual property user, the unique reference key for the intellectual property authenticator, and the unique reference key for the terms and conditions of use for each user.

The CCS uses the audit database 608 to save and archive transactional information about CCS activities such as transactions. The audit database contains a plurality of fields including a unique reference key for each record, information about each activity performed by the CCS, the time that the activity occurred, and the unique reference key of the user who initiated the activity.

The CCS uses the terms and conditions database 609 to store the terms and conditions of use specified by the intellectual property owner for each intellectual property user who has made a commitment to the intellectual property owner's offer. The terms and conditions database contains a plurality of fields including a unique reference key for each record, the unique reference key for the corresponding intellectual property owner, the unique reference key for the corresponding intellectual property user, date and time stamp, and the terms and conditions specified by the intellectual property owner.

The CCS uses the commitment database 610 to store information about the commitments to offers by each intellectual property user. The commitment database contains a plurality of fields including a unique reference key for each record, the unique reference key for the corresponding intellectual property owner, the unique reference key for the corresponding intellectual property user, the date and time stamp for the commitment, and the unique reference key for the corresponding offer.

The CCS uses the offers database 611 to store information about the offers made by each intellectual property owner. The offers database contains a plurality of fields including a unique reference key for each record, the unique reference key for the corresponding intellectual property owner, the content of the offer, the terms and conditions of the offer, the meta data associated with the offer, and the date and time stamp for the offer.

The CCS uses the unique tag database 612 to store information about the unique tag applied to each intellectual property transaction. The unique tag database contains a plurality of fields including a unique reference key for each record, information about the intellectual property, the unique reference key for the corresponding intellectual property owner, the unique reference key for the corresponding intellectual property user, the unique reference key for the corresponding offer, the unique reference key for the corresponding commitment and the actual unique tag.

The CCS uses the transactions database 613 to store information about each intellectual property transaction. The transactions database contains a plurality of fields including a unique reference key for each record, the unique reference key for the corresponding intellectual property owner, the unique reference key for the corresponding intellectual property user, the unique reference key for the corresponding offer, the unique reference key for the corresponding commitment and information about the actual transaction.

The CCS uses the notification database 614 to save and archive information about notifications. The notification database also stores links to templates for the different types of notification messages. A notification is a message sent to a user to inform that user that an event has occurred, such as a transaction. For each notification, the notification database contains a plurality of fields including a unique reference key for each record, the type of event that has caused the notification (e.g., a commitment to an offer), the unique reference key for the event that has caused the notification (e.g., the unique reference key for a specific commitment), the type of template to use for the notification, the unique reference key for the user to be notified (e.g., unique reference key for the intellectual property owner), the date and time of the event that caused the notification, the date and time that the notification was sent, the title of the notification, the message within the notification, the unique reference key for each user who shall receive a carbon copy of the notification and the unique reference key for each user who shall receive a blind copy of each notification.

The CCS uses the encryption database 615 to store information about the symmetric encryption keys, private encryption keys, and public encryption keys. The encryption database contains a plurality of fields including a unique reference key for each record, the unique reference key for each user and information about each key. The actual encryption keys are generated and controlled by the users. This information does not give the CCS access to the actual encryption keys.

The CGS uses the workflow management database 616 to store information about the preferred procedure to create intellectual property. The workflow management system has its own database that is described below. For each workflow submitted to the CCS, the workflow management database contains a plurality of fields including a unique reference key for each record, a name for the workflow, a description of the workflow, the steps in the workflow and the unique reference key for the type of workflow.

The CCS uses the intellectual property development database 617 to store status information about the intellectual property created by or uploaded by intellectual property owners. The intellectual property database contains a plurality of fields including a unique reference key for each record, the unique reference key for the corresponding intellectual property owner, and the current development stage in the preferred procedure to create intellectual property. For example, if the intellectual property owner is at a given step in the preferred procedure to create intellectual property then the status information is stored in the intellectual property development database.

The CCS uses the payment processor database 618 to store information about payments submitted by users of the present invention. The payment processor system has its own database that is described below. However, each payment that is submitted to the CCS is stored in the payment processor database. For each payment submitted to the CCS, the payment processor database contains a plurality of fields including a unique reference key for each record, the buyer's payment credentials, the amount of the payment, the payment method, the type of transaction, the date and time that the payment was submitted, whether the payment was accepted or rejected and the date and time that the payment was confirmed or rejected. The payment processor can also track volumes per unit time and trigger an alert if a user's volume exceeds predetermined thresholds. For example, a user may only be permitted to spend up to $300 per day or $5,000 per month say.

Figure 7:
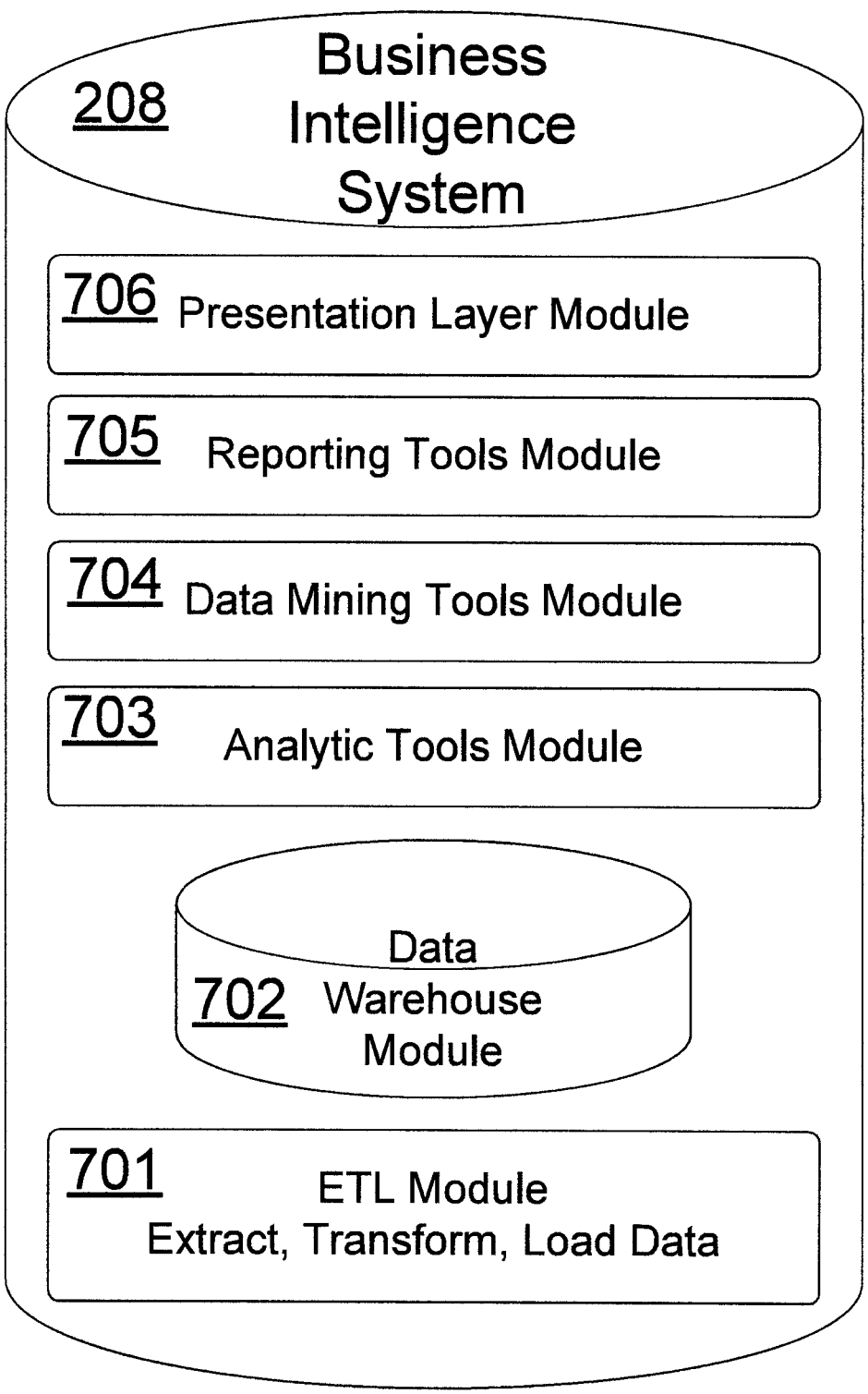
FIG. 7 illustrates a first embodiment of the business intelligence system ("BIS") of the present invention.

FIG. 7 illustrates the key components of the Business Intelligence System in a first embodiment of the apparatus and method of the present invention.

The Business Intelligence System 208 is operatively coupled to the CCS. Many companies supply business intelligence systems that can be used by the present invention including Microstrategy and Oracle. The CCS uses the business intelligence system to analyze data stored in the plurality of databases that comprise the data storage system 207. The purpose of the analysis by the business intelligence system is to identify trends, patterns and relationships that may be hidden in the data stored in the data storage system.

The present invention uses a commercial Business Intelligence System 208 that is illustrated in FIG. 7. It includes a plurality of modules including an extract, transform and data load "ETL" module 701, a data warehouse module 702, an analytic tools module 703, a data mining module 704, a reporting tools module 705 and a presentation layer module 706. The main purpose of a business intelligence system is to enable organizations to capture, process and analyze vast amounts of data from a plurality of sources then identify trends, patterns and relationships that can facilitate business decision-making.

The ETL module 701 is the interface between the Business Intelligence System and the CCS. The main purpose of the ETL module is to transfer data from the CCS to the data warehouse. Using ETL tools to operatively couple a system, such as the Business Intelligence System, to the CCS is explained above in the description of FIG. 2.

The data warehouse module 702 is a database built in a commercial storage system substantially the same as the data storage system described in FIG. 6. The data warehouse module contains a copy of a pre-determined subset of the total data that is available in the data storage system 207. The system administrator user specifies the data in the data storage system that the system administrator wants to use for business analysis. The installation engineer configures the ETL module to extract that pre-determined data from the source database in the data storage system, then configures the ETL module to transform that data into a format that is compatible with the data warehouse, then configures the ETL module to load the transformed data into the pre-determined database locations in the data warehouse module. The installation engineer also configures the ETL module to repeat this extract, transform and data load procedure periodically. Many vendors offer commercial data warehousing solutions including Hyperion, Microstrategy and Oracle.

The analytic tools module 703 includes standard on-line analytical processing ("OLAP") functionality. OLAP software enables users to create various views and representations of data in the data warehouse. OLAP functionality enables the system administrator user to access, analyze and model business issues and share the information that is in the data warehouse. Many vendors offer commercial data warehousing and OLAP solutions including Hyperion, Microstrategy and Oracle. The OLAP council creates OLAP standards.

The data mining tools module 704 enables the system administrator user to discover trends, patterns and relationships in the data stored in the data warehouse module. Data mining software is designed to analyze large volumes of data using sophisticated data search techniques then apply statistical methods to discover trends, patterns and relationships in the data. Many vendors offer commercial data mining software including Baan Software, Oracle, SAP, Sybase and Tableau Software. The Data Mining Group is an independent, vendor led consortium that develops data mining standards.

The reporting tools module 705 enables the system administrator user to create reports that display the data stored in the data warehouse as well as information that illustrates the trends, patterns and relationships in the data stored in the data warehouse module. Many vendors offer commercial reporting software including Business Objects, Cognos, Crystal Reports and Microstrategy.

The presentation layer module 706 includes graphics and multimedia interfaces that enable information and reports to be displayed in a user-friendly manner. The reporting tools described above all include a presentation layer module.

Figure 8:
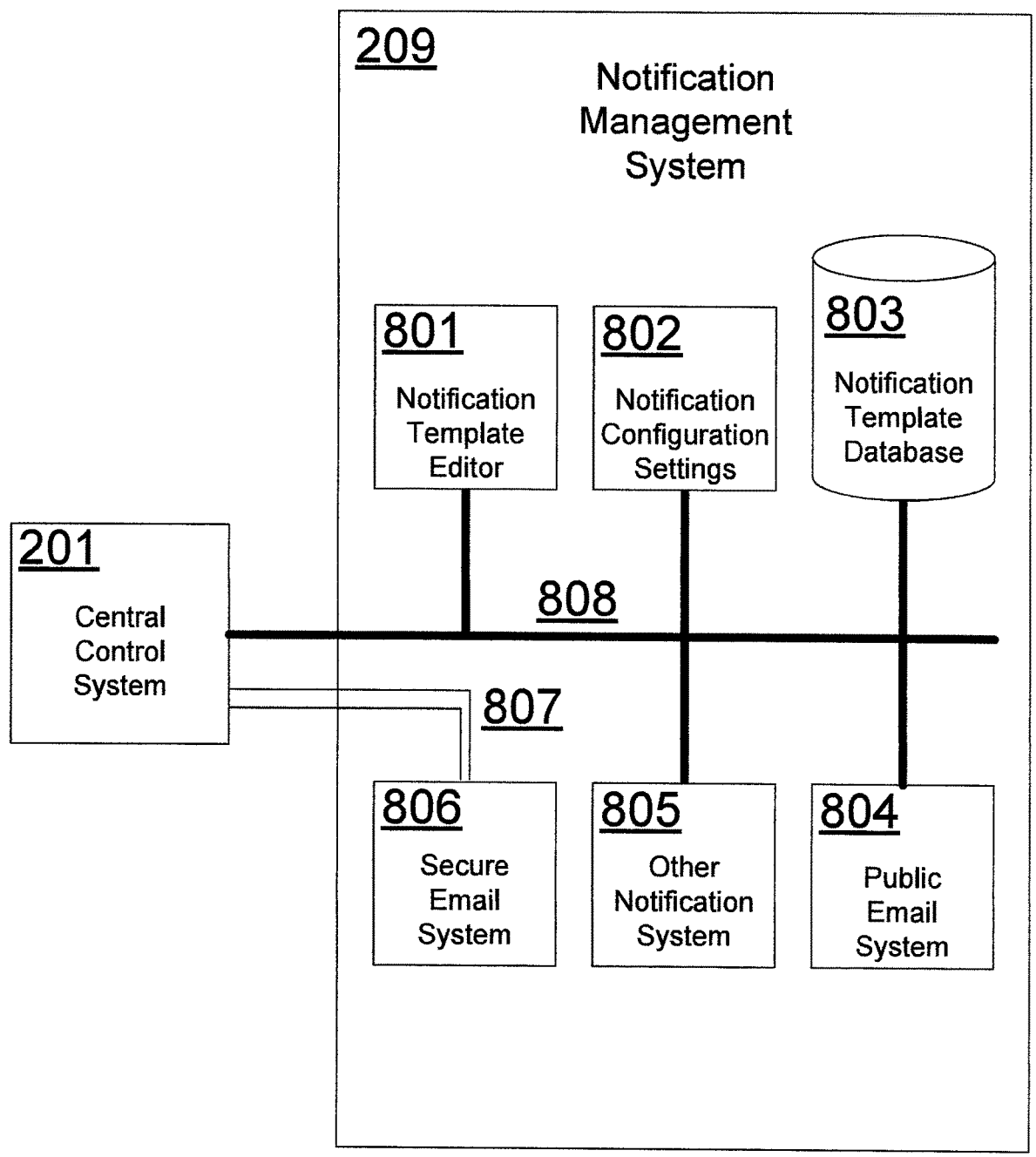
FIG. 8 illustrates a first embodiment of the notification management system ("NMS") of the present invention.

FIG. 8 illustrates the key components of the notification management system in a first embodiment of the apparatus and method of the present invention.

The notification management system 209 is operatively coupled to the CCS. The purpose of the notification management system is to send a notification whenever an event occurs that requires the attention of a user. The CCS sends a notification message via the notification management system to inform the recipient of the notification that a key event has occurred such as a payment has been made. The system administrator user configures the notification management system to monitor a plurality of other events then alert the pre-determined user when the specific event occurs.

FIG. 8 illustrates the Notification Management System used by the present invention. This Notification Management System includes a plurality of modules including a notification template editor 801, a notification configuration settings module 802, a notification template database 803, at least one public email system 804, at least one other notification system 805, a secure email system 806, a virtual private network (VPN) 807 and a wide area network 808.

The notification template editor 801 is a standard commercial word processor that the system administrator user can use to draft notification templates. The system administrator user then saves those templates into the notification template database 803. The system administrator inserts bookmarks into the notification template where information must be added to convert the template into an actual notification message. For example, the system administrator inserts a bookmark for the notification address (such as an email address) of the pre-determined user to whom the notification shall be sent.

The system administrator user uses the notification configuration settings module 802 to configure and enable the notifications. For example, in one embodiment of the present invention the system administrator user will configure a notification to be sent whenever a commitment is made to an offer. The configuration information will include a plurality of information including the event (e.g., a commitment), the contact information for the user to be notified, the title of the notification, information about the commitment, and related meta data.

The notification template database 803 is used to store notification templates. For each notification template, the notification template database contains a plurality of fields including a unique reference key for each record, the unique reference key for the type of event for which the notification template shall be used, the title of the event, the standard message in the notification, the unique reference key for each user who shall receive the notification, the unique reference key for each user who shall receive a carbon copy of the notification and the unique reference key for each user who shall receive a blind copy of the notification. When a predetermined event occurs, the CCS will identify the predetermined users to whom the notification shall be addressed, the predetermined users who shall receive a copy of the notification and the predetermined users who shall receive a blind copy of the notification. The CCS passes this information and a plurality of other information, such as the predetermined template to use for the specific event, to the notification management system that extracts information from the notification database 614 to fill in the blanks in the predetermined notification template.

The public email system 804 enables users to receive notifications from the CCS by email. It also enables users to send emails to the CCS. A plurality of public email systems are available to users including yahoo mail, hotmail, and gmail. When a user registers with the CCS, that user must input an email address that the CCS will use to send notifications.

To one skilled in the art, it will be evident that the CCS can use other notification systems 805 to notify users that an event has occurred. Other possible notification systems include instant messaging, text messages, telephone service, and wireless services. When the user registers with the CCS, the user can input their contact information for their alternative notification systems.

The secure email system 806 enables users to receive secure notifications from the CCS by email. It also enables users to send secure emails to the CCS. A plurality of vendors provide secure email services, such as Zix mail. When a user registers with the CCS, the CCS will give that user a secure email address. The CCS is connected to the secure email system by a virtual private network (VPN) 807. Commercial telephone companies such as Verizon provide virtual private networks. These VPN circuits provide more security than a regular telephone circuit. The other components of the notification management system are interconnected by a combination of wide and local area networks 808. Such networks are described above in the discussion of FIG. 3.

When an event occurs that requires a notification that does not include sensitive information, the CCS will send the notification to the user's secure email address and also to the user's public email address. When an event occurs that requires a notification that does include sensitive information then the CCS will send the notification to the user's secure email address. The CCS will also send a different notification to the user's public email address informing that user that a secure notification message has been sent to that user's secure email address. The user will then log in to the CCS to access the secure notification.

Figure 9:
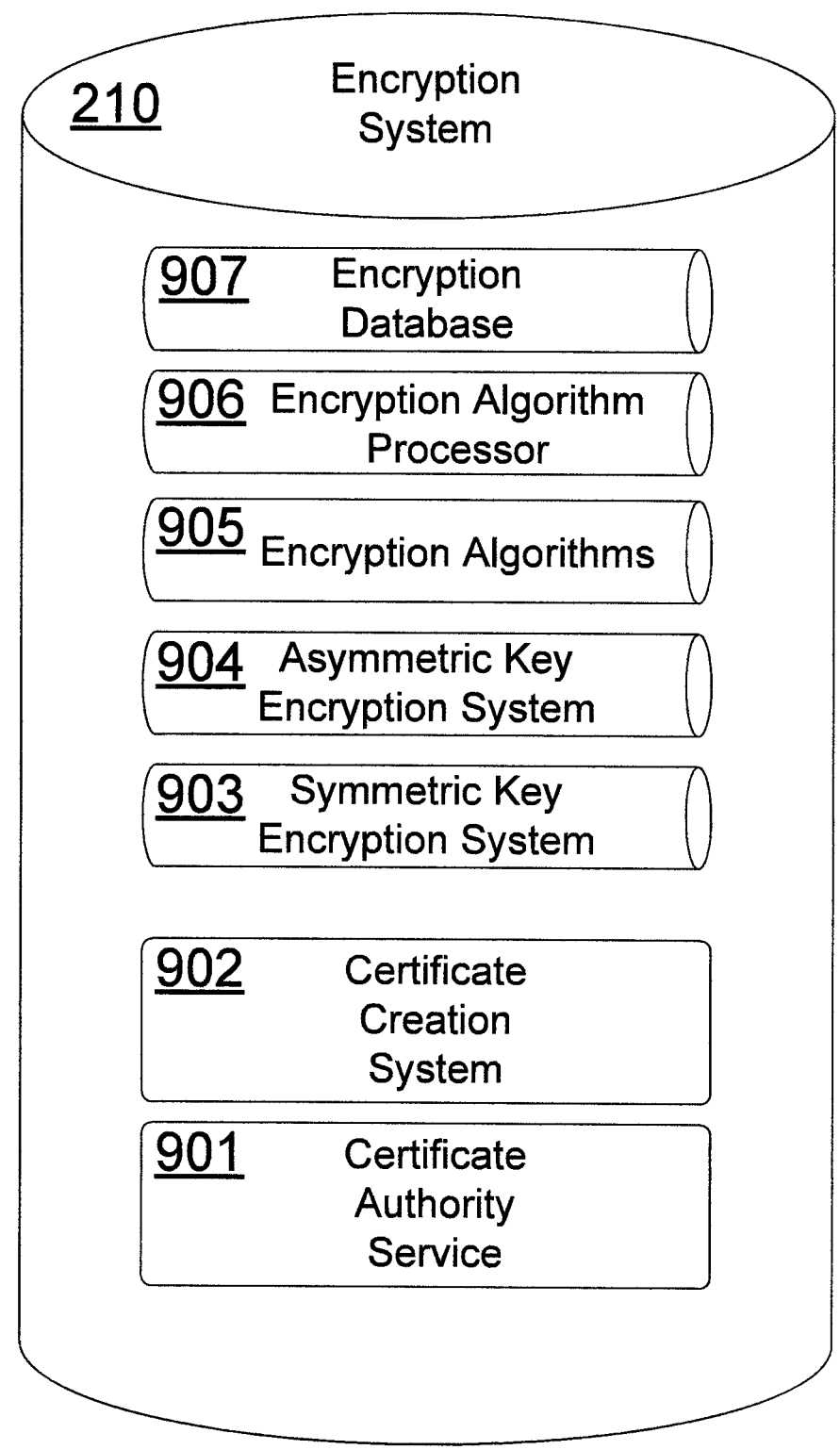
FIG. 9 illustrates a first embodiment of the encryption system of the present invention.

FIG. 9 illustrates the key components of the Encryption System 210 which is operatively coupled to the Central Control System. The Encryption System used by the present invention is comprised of a plurality of modules including a certificate authority service 901, a certificate creation system 902, a symmetric key encryption system 903, an asymmetric key encryption system 904, encryption algorithms 905, an encryption algorithm processor 906, and an encryption database 907.

The certificate authority service 901 is independent of both the intellectual property owner and intellectual property user. It is a source that is trusted by the intellectual property owner and the intellectual property user and confirms that they both are who they say they are. In addition, the certificate authority service provides the owner's and user's public encryption keys to each other. In summary, the certificate authority service authenticates the intellectual property owner and the fact that the intellectual property has not been altered.

Authentication is used with encryption to create a secure communication environment. Standard authentication systems include user name and password, pass cards that use a magnetic strip similar to that on a credit card, smart cards that have an embedded chip, and digital signatures based on the Digital Signature Standard (DSS) that uses the Digital Signature Algorithm (DSA). More modern forms of encryption use biometrics for authentication. Biometrics use biological information to verify a user's identity. Biometric authentication methods include fingerprint scans, retina scans, face scans and voice identification. Biometric authentication eliminates many of the risks associated with not knowing who is using an authenticated input or output device. Biometric authentication therefore provides an additional level of security over device level authentication for secure personal communications.

The certificate creation system 902 generates a certificate for each user in the form of a piece of code, or a large number, that says that the user is trusted by the certificate authority. When the intellectual property owner, for example, sends digital media to the intellectual property user, the intellectual property owner sends the public encryption key and his or her certificate to the intellectual property user, to validate three things: 1) that the certificate comes from a trusted party; 2) that the certificate is currently valid; and 3) that the certificate has a relationship with the present invention.

The symmetric key encryption system 903 generates a secret code for each user. The encryption system uses this secret code, or encryption key, to encrypt information. Modern encryption systems use the advanced encryption standard (AES), which uses 128-, 192- or 256-bit encryption keys. These create more than $2^{128}$ possible key combinations. For a hacker trying to guess the encryption key, this is like trying to find one specific grain of sand in the Sahara Desert. It would take a hacker so long to guess the correct key combination that this encryption standard is considered to be secure for the foreseeable future. For symmetric key encryption, the same key is used to encrypt and decrypt a message. The use of symmetric encryption keys and asymmetric encryption keys in the present invention is described below.

The asymmetric key encryption system 904 generates two secret codes for each user, a public encryption key and a private encryption key. When a first user wants to send an encrypted message to a second user but does not want to risk sending the encryption key then the asymmetric key encryption system is used. The use of symmetric encryption keys and asymmetric encryption keys in the present invention is described below. For example, in the present invention, when the intellectual property owner wants to send a symmetric encryption key to an intellectual property user, the intellectual property owner uses the public encryption key of the selected intellectual property user to encrypt the symmetric encryption key. The intellectual property user then uses his or her private encryption key to decrypt the symmetric encryption key. This is possible because an encryption algorithm is used where the algorithm, or function "F" is such that, F (clear symmetric encryption key, buyer's public encryption key)=encrypted symmetric encryption key and F (encrypted symmetric encryption key, buyer's private encryption key)=clear symmetric encryption key. Therefore, by using the same algorithm ("F") a user's private encryption key can be used to decrypt the symmetric encryption key that was encrypted by the same user's public encryption key (U.S. Pat. No. 8,374,354 B2). One advantage of the present invention is that the encryption and decryption are performed at the user interface preferably initiated by biometrics. In this case, the present invention only has access to the encrypted version of the symmetric encryption key and cannot decrypt the symmetric encryption key. The symmetric encryption key is used to encrypt and decrypt the intellectual property. In other systems, encryption is used to secure the transmission of digital media from the user to the system. This enables the digital media to be decrypted by the system operator which creates the risk of hacking supported by rogue employees of the system operator.

A number of encryption algorithms 905 have been created that can be used by the present invention. Symmetric key encryption algorithms include The Data Encryption Standard (DES) was adopted as a U.S. government standard in 1977 and as an ANSI standard in 1981. Triple-DES is a way to make the DES dramatically more secure by using the DES encryption algorithm three times with three different keys, for a total key length of 168 bits. Also called "3DES," this algorithm has been widely used by financial institutions and by the Secure Shell program (ssh). Blowfish is a fast, compact, and simple block encryption algorithm invented by Bruce Schneier. The algorithm allows a variable-length key, up to 448 bits, and is optimized for execution on 32- or 64-bit processors. The algorithm is unpatented and has been placed in the public domain. Blowfish is used in the Secure Shell and other programs. Asymmetric key encryption algorithms include the Rivest Shamir Adleman (RSA) public encryption key algorithm that can be used for encrypting and signing data and Elliptic Curve Cryptography (ECC) which provides similar functionality to RSA for smaller devices like cell phones. It requires less computing power than RSA. ECC encryption systems are based on the idea of using points on a curve to define the public/private encryption key pair. The present invention can use these and other standard encryption algorithms.

The encryption algorithm processor 906 is the code that is used to encrypt and decrypt the intellectual property in the form of digital media. The present invention includes its own code for these purposes and also can use other code considered to comply with industry standards. By way of example, sample code that was published by syntx.io (http://syntx.io/basic-symmetric-encryption-example-with-java/) includes the following to encrypt a message using AES as the algorithm:

```
public static final String encrypt(final String message, final Key key, final IvParameterSpec iv) throws IllegalBlockSizeException,
   BadPaddingException, NoSuchAlgorithmException,
   NoSuchPaddingException, InvalidKeyException,
   UnsupportedEncodingException,
InvalidAlgorithmParameterException {
   Cipher cipher=Cipher.getInstance("AES/CBC/PKCS5Padding");
   cipher.init(Cipher.ENCRYPT_MODE,key,iv);
   byte[ ] stringBytes=message.getBytes( );
   byte[ ] raw=cipher.doFinal(stringBytes);
   return Base64.encodeBase64String(raw);
}
```

The same example from syntx.io published the following code to decrypt the message:

```
public static final String decrypt(final String encrypted,
final Key key, final IvParameterSpec iv) throws Invalid-
KeyException,
    NoSuchAlgorithmException, NoSuchPaddingException,
    IllegalBlockSizeException,        BadPaddingException,
IOException, InvalidAlgorithmParameterException {
    Cipher        cipher=Cipher.getInstance("AES/CBC/
        PKCS5Padding");
    cipher.init(Cipher.DECRYPT_MODE, key,iv);
    byte[ ] raw=Base64.decodeBase64(encrypted);
    byte[ ] stringBytes=cipher.doFinal(raw);
    String clearText=new String(stringByths, "UTF8");
    return clearText;
}
```

It will be evident to one skilled in the art that more robust algorithms are available for use, can be developed, and can be used by the present invention.

The encryption database 907 is substantially the same as the encryption database 615 in FIG. 6. It stores the encryption information required by the other modules described above that comprise the encryption system.

Figure 10:
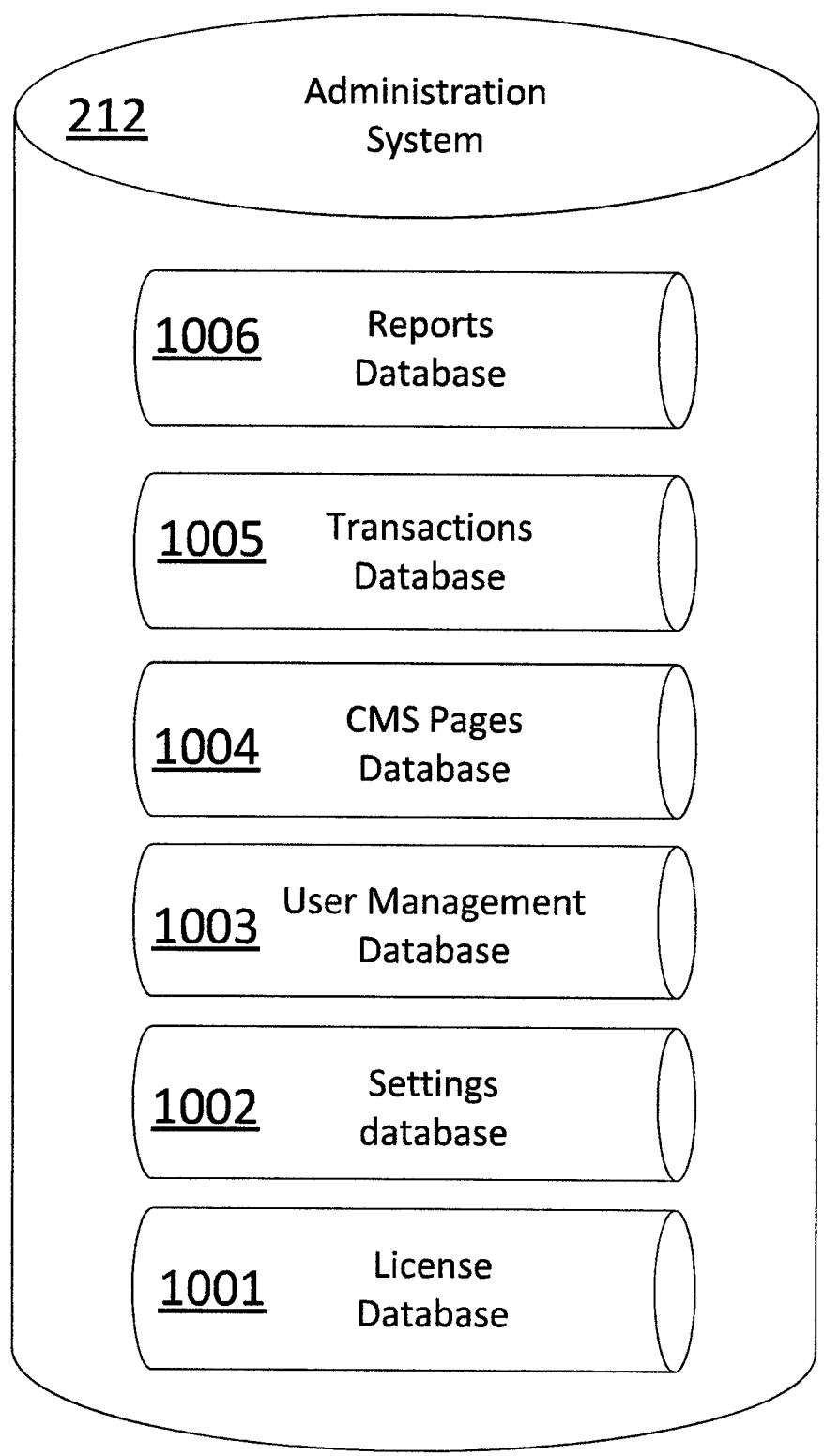
FIG. 10 illustrates a first embodiment of the administration system of the present invention.

FIG. 10 illustrates the key components of the Administration System 213 which is operatively coupled to the Central Control System. The Administration System used by the present invention is comprised of a plurality of modules including a license database 1001, a settings database 1002, a user management database 1003, a CMS pages database 1004, a transactions database 1005, and a reports database 1006.

The license database 1001 stores information about which users are authorized to use the present invention. The license database contains a plurality of fields including a unique reference key for each record in the license database, the unique reference key of each user, contact information for each user, and licensing and payment information for each user.

The settings database 1002 stores configuration information for the present invention. Examples of settings include the percentage fee received by the operator of the present invention for each transaction, managing the list of default security questions for lost password recovery, and the payment options that are available, such as pay in advance, pay on delivery and pay on acceptance.

The user management database 1003 stores information about users. This information includes the type of user, contact information, and the user's status such as active or inactive.

The CMS pages database 1004 stores information about the web site pages and mobile user interface for the present invention. This module enables the system administrator to edit the content on these pages. Example pages include "About Us", "Frequently Asked Questions", "Home", and the "User Agreement".

The transactions database 1005 stores information about transactions in the present invention. The transactions database is substantially the same as the transactions database 613 in the data storage system 207. The transactions database in the administration system enables the system administrator to manage transactions and resolve issues.

The reports database 1006 stores information about reports in the present invention. These reports help the system administrator manage the present invention. Example reports include the amount of the available storage used, peak and average CPU utilization in system servers, and peak and average number of users.

FIG. 11 illustrates an overview of the Workflow Management System ("WMS") in a first embodiment of the apparatus and method of the present invention. The Workflow Management System is used to guide the creation of intellectual property 214 and is operatively coupled to the CCS. Many commercial WMS options are available that can be used by the present invention. However, the present invention uses a modified version of the WMS taught in co-owned application Ser. No. 10/716,747 (Nov. 18, 2003).

The WMS enables the system administrator to create a workflow that is the preferred procedure to develop intellectual property 1101.

The WMS enables the system administrator to modify the workflow that is the preferred procedure to develop intellectual property 1102.

The WMS enables the system administrator to save the workflow that is the preferred procedure to develop intellectual property 1103.

The WMS enables the system administrator to activate the workflow that is the preferred procedure to develop intellectual property 1104. This activation process makes the workflow accessible to intellectual property owners.

The WMS enables an intellectual property owner to start the preferred procedure to develop intellectual property 1105.

The WMS enables the intellectual property owner to open the selected procedure to develop intellectual property 1106.

The WMS guides the intellectual property owner through the preferred procedure to create intellectual property 1107.

The WMS saves the information created at each completed step in the process and also saves drafts for the incomplete steps 1108.

The WMS enables the intellectual property owner to resume the preferred procedure to create intellectual property until the production process is complete 1109.

The present invention enables intellectual property owners to use the WMS in conjunction with third party intellectual property development systems. For example, companies like Prosonus make music productions systems, like their Studio One products, that enable intellectual property owners to create music in accordance with the preferred procedure as guided by the WMS.

Preferred Embodiment of the Present Invention

Figure 12:
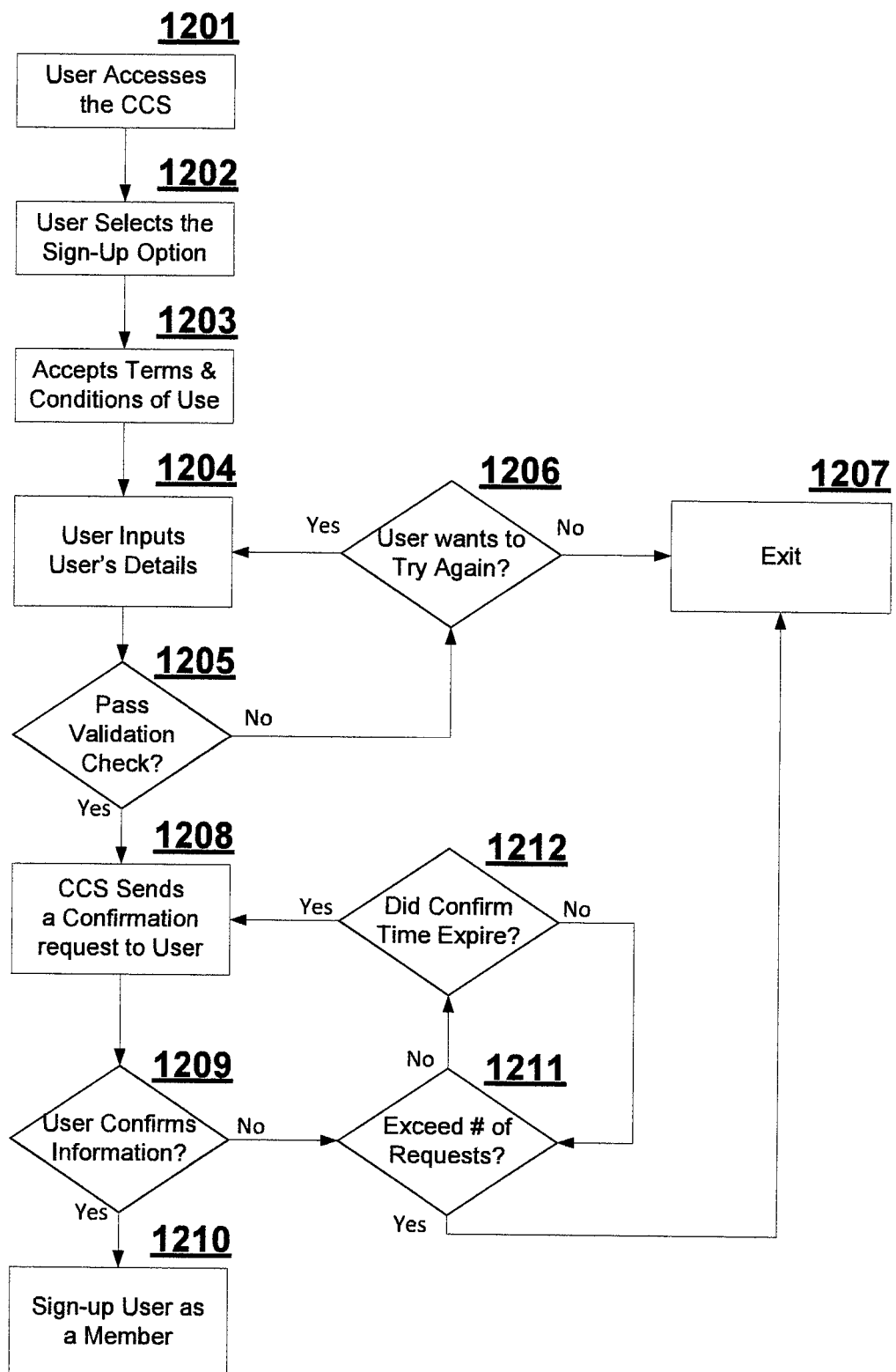
FIG. 12 illustrates a first embodiment of the sign-up procedure for the present invention.

FIG. 12 illustrates the procedure for users to sign-up as members in a first embodiment of the apparatus and method of the present invention.

The user accesses the CCS 1201 then selects the sign-up option 1202. The user then accepts the predetermined terms and conditions of use 1203. The user then inputs the requested user details 1204. These details include name, contact information, user name, password and the other meta data specified above for the user database illustrated in FIG. 6. When the user accesses the CCS after signing up as a member, that user will have to input the user name and password to log into the CCS. The CCS checks the information entered by the user at step 1204 for completeness. If the information is incomplete 1205, the CCS will offer the user the opportunity to complete the information 1206. If the user chooses to try again to complete the information, the CCS returns to step 1204. If the user chooses not to complete the sign up information, the CCS exits the sign-up procedure 1207.

If the information entered by the user is complete 1205, the CCS sends a confirmation request to the user 1208. The CCS will send this confirmation request to the email address entered by the user at step 1204. The user can also select to authenticate using a text message rather than an email. The CCS asks the user to confirm receipt of this request 1209. If the user confirms receipt of the confirmation request as requested by the CCS, the CCS will sign-up the user as a member 1210. If the user does not confirm receipt of the confirmation request, the CCS will determine whether the predetermined maximum number of reminder requests have been exceeded 1211. If the CCS has already sent the predetermined maximum number of confirmation requests, then the CCS will exit the sign-up procedure 1207. If the CCS has sent fewer than the predetermined maximum number of confirmation requests, then the CCS will determine whether the predetermined wait time has been exceeded 1212 before sending another confirmation request to the user. When the predetermined wait time between reminders has been exceeded 1212, the CCS will send another confirmation request to the user 1208. This will return the CCS to step 1208 in the sign-up procedure.

Figure 13:
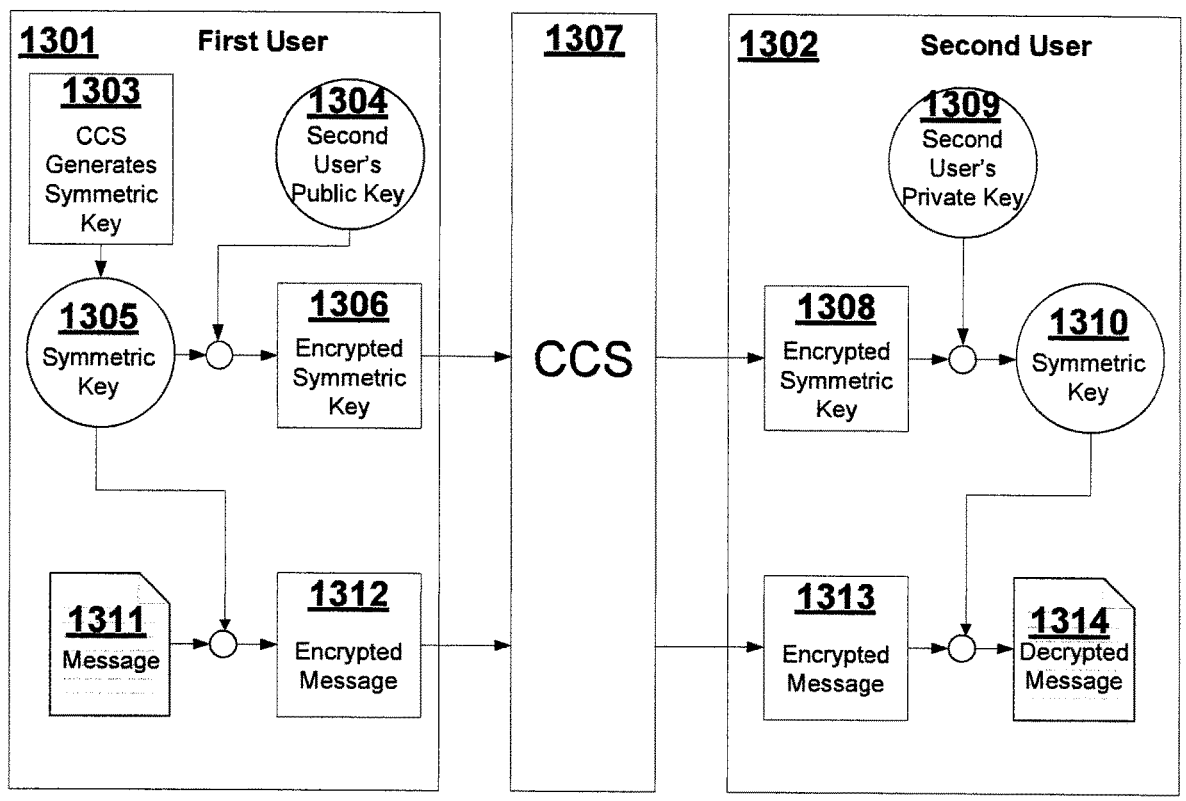
FIG. 13 illustrates a first embodiment of the high level encryption approach for the present invention.

FIG. 13 illustrates the preferred procedure to send a message from a first user 1301 to a second user 1302 through the CCS. When the first user and second user register on the system they download the CCS front end application onto their computer 301. The CCS application is created using standard programming languages such as Java, javascript, PHP, HTML, C, C+, and visual basic. The CCS also gives the first user and second user their own symmetric encryption key, private encryption key and public encryption key as described above for the encryption system. The first user and the second user both use the CCS to make their public encryption keys available to other users. When the first user wants to send a message to the second user, the CCS application in the first user's computer 301 generates a new symmetric encryption key 1303 for this transaction. The CCS then uses the second user's public encryption key 1304 to encrypt the symmetric encryption key 1305 and create an encrypted symmetric encryption key 1306. The CCS 1307 then transfers the encrypted symmetric encryption key from the first user to the second user. The CCS front end application on the second user's computer receives the encrypted symmetric encryption key 1308 then uses the second user's private encryption key 1309 to decrypt the encrypted symmetric encryption key and recover the symmetric encryption key 1310 that was generated by the CCS application on the first user's computer for this transaction.

The CCS application on the first user's computer also uses the same symmetric encryption key 1305 to encrypt the target message 1311 and form an encrypted message 1312. The CCS 1307 then transfers the encrypted message from the first user to the second user. The CCS front end application on the second user's computer receives the encrypted message 1313 then uses the second user's symmetric encryption key 1310 to decrypt the encrypted message and recover the original message 1314 that was sent by the CCS application on the first user's computer. The symmetric encryption key and message cannot be accessed by employees or partners of the CCS platform which minimizes the risk of unauthorized decryption.

Asymmetric encryption is slower than symmetric encryption. The CCS application therefore uses the public encryption key and private encryption key to encrypt and decrypt the symmetric encryption key because the symmetric encryption key is typically much smaller than the user's message. This is a secure method for the CCS to transfer the symmetric encryption key from the first user to the second user. This solution also enables the CCS application to use the faster symmetric key encryption to encrypt and decrypt the target message that is typically much larger than the symmetric encryption key.

Figure 14:
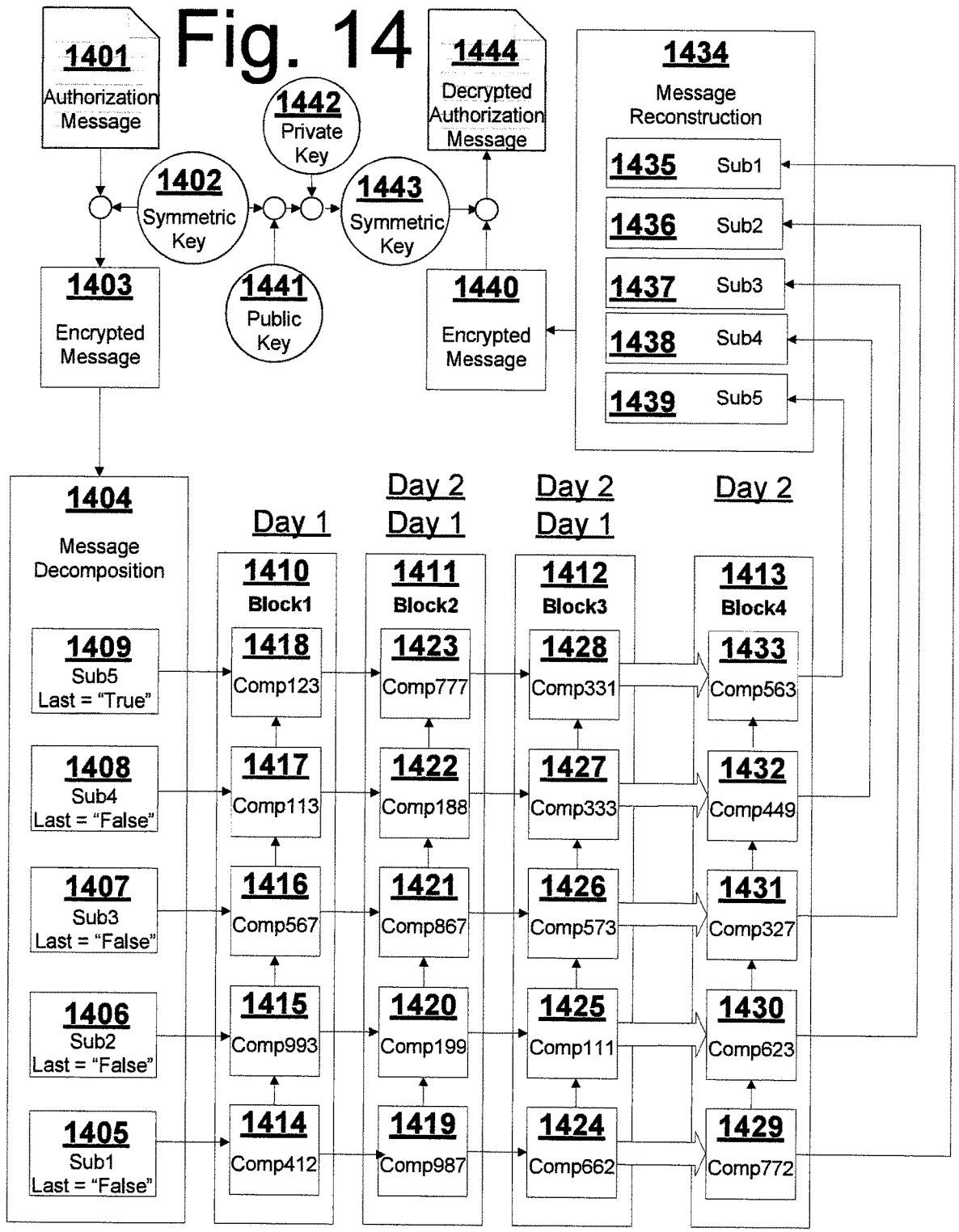
FIG. 14 illustrates a first embodiment of the high level authentication approach for the present invention.

FIG. 14 illustrates the preferred procedure to input and output a secure authorization 1401, such as a prescription for medical products, an authentication certificate for digital media or a reference file for biometric authentication. The GCS application on a first user's computer generates a unique symmetric encryption key 1402 to encrypt each authorization message 1403. The CCS front end application on the user's device generates a different symmetric encryption key for each message. The CCS application on the first user's computer then decomposes the authorization message into a number of subcomponents 1404. A number of tools are available to split a file into subcomponents, such as WinRar and HJSplit. For example, WinRar allows the user to specify the size of each subcomponent. The example in FIG. 14, decomposes the message 1404 into 5 subcomponents Sub1 1405, Sub2 1406, Sub3 1407, Sub4 1408, and Sub5 1409 in that order. It also sets the "last subcomponent flag" to "False" for Sub1 1405, Sub2 1406, Sub3 1407, and Sub4 1408 but sets the "last subcomponent flag" to "True" for Sub5 1409 because Sub5 1409 is the last subcomponent of message 1404. It also sets the counter=1 for Sub1 1405, counter=2 for Sub2 1406, counter=3 for Sub3 1407, counter=4 for Sub4 1408 and counter=5 for Sub5 1409. The CCS application on the first user's computer randomly selects three computers, Comp412 1414, Comp987 1419, and Comp682 1424, from a predetermined list of member computers. Each organization that wants to use this dynamic process to decompose encrypted messages can propose a computer to participate in the consortium of member computers. After the system administrator vets the organization and vets the proposed computer then the vetted computer is added to the list of member computers. The CCS application on the first user's computer, writes the first subcomponent 1405 of the decomposed encrypted authorization message and the counter value (e.g., 1) and the "last subcomponent flag" (e.g., "False") from subcomponent1 (Sub1) to computer 412 (Comp412) 1414. It also writes the same subcomponent) (Sub1), counter value and "last subcomponent flag" to computer 987 (Comp987) 1419 and the same subcomponent1 (Sub1), counter value and "last subcomponent flag" to computer 662 (Comp662) 1424.

Computer 412 (Comp412) 1414 then randomly selects another computer from the predetermined list of member computers, namely computer 993 (Comp993) 1415. Computer 412 (Comp412) 1414 then instructs the CCS application on the first user's computer to copy subcomponent2 (Sub2), the counter value (e.g., 2) and the "last subcomponent flag" (e.g., "False") 1406 to computer 993 (Comp993) 1415. When Computer 412 (Comp412) 1414 makes this request, it increments its own counter by 1 (e.g., 1+2=2) to know which subcomponent (e.g., Sub2) to request from block 1404 to be sent to computer 993 (Comp993) 1415. Similarly, Computer 987 (Comp987) 1419 randomly selects another computer from the predetermined list of member computers, namely computer 199 (Comp199) 1420. Computer 987 (Comp987) 1419 then instructs the CCS application on the first user's computer to copy subcomponent2 (Sub2), the counter value (e.g., 2) and the "last subcomponent flag" (e.g., "False") 1406 to computer 199 (Comp199) 1420. Further, Computer 662 (Comp662) 1424 randomly selects another computer from the predetermined list of member computers, namely computer 111 (Comp111) 1425. Computer 662 (Comp662) 1424 then instructs the CCS application on the first user's computer to copy subcomponent2 (Sub2), the counter value (e.g., 2) and the "last subcomponent flag" (e.g., "False") 1406 to computer 111 (Comp111) 1425.

Computer 993 (Comp993) 1415 then randomly selects another computer from the predetermined list of member computers, namely computer 567 (Comp567) 1416. Computer 993 (Comp993) 1415 then instructs the CCS application on the first user's computer to copy subcomponent3 (Sub3), the counter value (e.g., 3) and the "last subcomponent flag" (e.g., "False") 1407 to computer 567 (Comp567) 1416. When Computer 993 (Comp993) 1415 makes this request, it uses its own counter+1 (e.g., 2+1=3) to determine which subcomponent (e.g., Sub3) to request from block 1404 to be sent to computer 567 (Comp567) 1416. Similarly, Computer 199 (Comp199) 1420 randomly selects another computer from the predetermined list of member computers, namely computer 867 (Comp867) 1421. Computer 199 (Comp199) 1420 then instructs the CCS application on the first user's computer to copy subcomponent3 (Sub3), the counter value (e.g., 3) and the "last subcomponent flag" (e.g., "False") 1407 to computer 867 (Comp867) 1421. Further, Computer 111 (Comp111) 1425 randomly selects another computer from the predetermined list of member computers, namely computer 573 (Comp573) 1426. Computer 111 (Comp111) 1425 then instructs the CCS application on the first user's computer to copy subcomponent3 (Sub3), the counter value (e.g., 3) and the "last subcomponent flag" (e.g., "False") 1407 to computer 573 (Comp573) 1426.

Computer 567 (Comp567) 1416 then randomly selects another computer from the predetermined list of member computers, namely computer 113 (Comp113) 1417. Computer 567 (Comp567) 1416 then instructs the CCS application on the first user's computer to copy subcomponent4 (Sub4), the counter value (e.g., 4) and the "last subcomponent flag" (e.g., "False") 1408 to computer 113 (Comp113) 1417. When Computer 567 (Comp567) 1416 makes this request, it uses its own counter+1 (e.g., 3+1=4) to determine which subcomponent (e.g., Sub4) to request from block 1404 to be sent to computer 113 (Comp113) 1417. Similarly, Computer 867 (Comp867) 1421 randomly selects another computer from the predetermined list of member computers, namely computer 188 (Comp188) 1422. Computer 867 (Comp867) 1421 then instructs the CCS application on the first user's computer to copy subcomponent4 (Sub4), the counter value (e.g., 4) and the "last subcomponent flag" (e.g., "False") 1408 to computer 188 (Comp188) 1422. Further, Computer 573 (Comp573) 1426 randomly selects another computer from the predetermined list of member computers, namely computer 333 (Comp333) 1427. Computer 573 (Comp573) 1426 then instructs the CCS application on the first user's computer to copy subcomponent4 (Sub4), the counter value (e.g., 4) and the "last subcomponent flag" (e.g., "False") 1408 to computer 333 (Comp333) 1427.

Computer 113 (Comp113) 1417 then randomly selects another computer from the predetermined list of member computers, namely computer 123 (Comp123) 1418. Computer 113 (Comp113) 1417 then instructs the CCS application on the first user's computer to copy subcomponent5 (Sub5), the counter value (e.g., 5) and the "last subcomponent flag" (e.g., "True") 1409 to computer 123 (Comp123) 1418. When Computer 113 (Comp113) 1417 makes this request, it uses its own counter+1 (e.g., 4+1=5) to determine which subcomponent (e.g., Sub5) to request from block 1404 to be sent to computer 123 (Comp123) 1418. Similarly, Computer 188 (Comp188) 1422 randomly selects another computer from the predetermined list of member computers, namely computer 777 (Comp777) 1423. Computer 188 (Comp188) 1422 then instructs the CCS application on the first user's computer to copy subcomponent5 (Sub5), the counter value (e.g., 5) and the "last subcomponent flag" (e.g., "True") 1409 to computer 777 (Comp777) 1423. Further, Computer 333 (Comp333) 1427 randomly selects another computer from the predetermined list of member computers, namely computer 331 (Comp331) 1428. Computer 333 (Comp333) 1427 then instructs the CCS application on the first user's computer to copy subcomponent5 (Sub5), the counter value (e.g., 5) and the "last subcomponent flag" (e.g., "True") 1409 to computer 331 (Comp331) 1428.

Block1 1410 is a copy of the encrypted authorization message distributed across five random computers. Block2 1411 is a second copy of the encrypted authorization message distributed across five different random computers. Block3 1412 is a third copy of the encrypted authorization message distributed across five more random computers. None of the computers in each block know all of the other computers in the block. For example, Comp993 1415 only knows that Comp567 1416 is the next computer in the chain after itself for Block1. It does not know that Comp113 1417 is the next computer after Comp567 1416. This makes the solution more secure because a hacker would have to break into many independent computers to recover the encrypted information then that hacker would need to figure out how to reconstruct the messages and also figure out how to decrypt the information. This additional security is appropriate for the storage of referenceable personal identifiable information such as customer biometrics and prescription information. After a pre-determined period of time, one day say, the CCS application on the first user's computer randomly selects another computer 1429 from a predetermined list of member computers. The CCS application on the first user's computer, writes the first subcomponent of the decomposed encrypted authorization message from subcomponent1 (Sub1), the counter value (e.g., 1) and the "last subcomponent flag" (e.g., "False") 1405 to computer 772 1429. Similar to above, computer 772 (Comp772) 1429 randomly selects another computer from the predetermined list of member computers, namely computer 623 (Comp623) 1430 then instructs the CCS application on the first user's computer to copy subcomponent2 (Sub2), the counter value (e.g., 2) and the "last subcomponent flag" (e.g., "False") 1406 to computer 623 (Comp623) 1430. Similar to above, computer 623 (Comp623) 1430 randomly selects another computer from the predetermined list of member computers, namely computer 327 (Comp327) 1431 then instructs the CCS application on the first user's computer to copy subcomponent3 (Sub3), the counter value (e.g., 3) and the "last subcomponent flag" (e.g., "False") 1407 to computer 327 (Comp327) 1431. Similar to above, computer 327 (Comp327) 1431 randomly selects another computer from the predetermined list of member computers, namely computer 449 (Comp449) 1432 then instructs the CCS application on the first user's computer to copy subcomponent4 (Sub4), the counter value (e.g., 4) and the "last subcomponent flag" (e.g., "False") 1408 to computer 449 (Comp449) 1432. Similar to above, computer 449 (Comp449) 1432 randomly selects another computer from the predetermined list of member computers, namely computer 563 (Comp563)

1433 then instructs the CCS application on the first user's computer to copy subcomponent5 (Sub5), the counter value (e.g., 5) and the "last subcomponent flag" (e.g., "True") 1409 to computer 563 (Comp563) 1433. This flag indicates that subcomponent5 is the final subcomponent that comprises the authorization message 1401.

Block4 1413 is a fourth copy of the encrypted authorization message distributed across five random computers. The CCS instructs the CCS application on the first user's computer to delete Block 1 1410 by discarding subcomponent) (Sub1) from computer 412 (Comp412) 1414. Computer 412 (Comp412) 1414 then instructs Computer 993 (Comp993) 1415 to discard subcomponent2 (Sub2) from computer 993 (Comp993) 1415. Computer 993 (Comp993) 1415 then instructs Computer 567 (Comp567) 1416 to discard subcomponent3 (Sub3) from computer 567 (Comp567) 1416. Computer 567 (Comp567) 1416 then instructs Computer 113 (Comp113) 1417 to discard subcomponent4 (Sub4) from computer 113 (Comp113) 1417. Computer 113 (Comp113) 1417 then instructs Computer 123 (Comp123) 1418 to discard subcomponent5 (Sub5) from computer 123 (Comp123) 1418. In the example illustrated in FIG. 14, on Day 1 Block1, Block2 and Block3 form three copies of the decomposed messages. On Day 2, Block4 is created and Block1 is deleted. This process of creating a new block and deleting an old block continues until the message is no longer required. This causes the three copies of the decomposed message to keep moving dynamically throughout the network of member computers making the information more difficult to find for a hacker.

In order for the CCS application on the second user's computer (such as a pharmacist reviewing a prescription, an intellectual property user reviewing an authentication certificate or a user authenticating a biometric parameter) to reconstruct the authorization message, the CCS application on the first user's computer (such as the prescribing doctor or intellectual property owner) sends a unique authorization identifier ("authorization ID") to the second user (pharmacist or intellectual property user). Alternatively, the first user (e.g., the doctor or intellectual property owner) can give the authorization identifier to the patient or intellectual property reseller who can forward it to the pharmacist or intellectual property user. The pharmacist or intellectual property user uses the unique authorization identifier to request the authorization (e.g., request the prescription or authentication certificate). The CCS verifies the unique authorization identifier then copies subcomponent1 (Sub1) from computer 772 (Comp772) 1429 to the second user's computer 1435. Similarly, computer 772 (Comp772) 1429 knows that computer 623 (Comp623) 1430 is the next computer in Block4 and instructs computer 623 (Comp623) 1430 to write subcomponent2 (Sub2) to the second user's computer 1436. Similarly, computer 623 (Comp623) 1430 knows that computer 327 (Comp327) 1431 is the next computer in Block4 and instructs computer 327 (Comp327) 1431 to write subcomponent3 (Sub3) to the second user's computer 1437. Similarly, computer 327 (Comp327) 1431 knows that computer 449 (Comp449) 1432 is the next computer in Block4 and instructs computer 449 (Comp449) 1432 to write subcomponent4 (Sub4) to the second user's computer 1438. Similarly, computer 449 (Comp449) 1432 knows that computer 563 (Comp563) 1433 is the next computer in Block4 and instructs computer 563 (Comp563) 1433 to write subcomponent5 (Sub5) to the second user's computer 1439. Computer 563 (Comp563) 1433 knows that it is the final computer in the chain because its "last subcomponent flag" is set to "True" indicating that subcomponent5 is the final subcomponent that comprises the authorization message 1401. The second user can alternatively reconstruct the message from the computers in Block3 or Block2 in addition to Block4.

The CCS application on the second user's computer then uses the same decomposition application, such as WinRar or HJSplit, to reconstruct the encrypted authorization message 1440. The CCS application on the first user's computer uses the second user's public encryption key 1441 to encrypt the symmetric encryption key 1402. The first user then uses the CCS to send the encrypted symmetric encryption key to the second user. The CCS application on the second user's computer then uses her private encryption key 1442 to decrypt the symmetric encryption key 1443. The CCS application on the second user's computer then uses the symmetric encryption key 1443 to decrypt the authorization message 1444.

The example in FIG. 14, illustrates three copies of the authorization message one in each of Block1 1410, Block2 1411 and Block3 1412. In the present invention, the number of replicated messages can be reduced to 1 or 2 or increased to more than 3 to provide more or less redundancy in order to match the specific needs of each business requirement.

Figure 15:
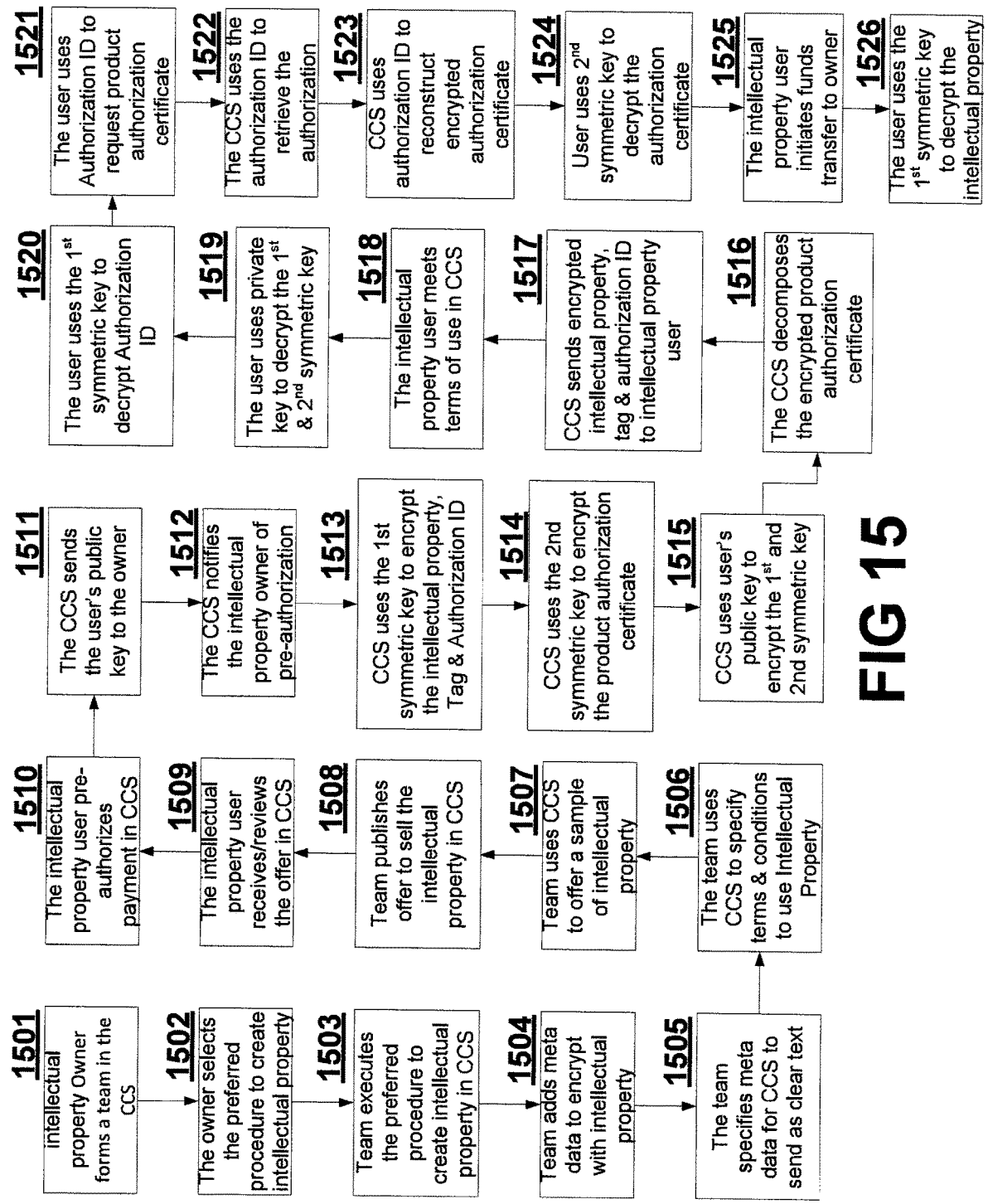
FIG. 15 illustrates a first embodiment of the high level business procedure for the present invention.

FIG. 15 illustrates a high level summary of the preferred embodiment of the present invention. The users download the CCS front end application from an app store onto their mobile devices and onto their other user interface devices. The intellectual property owner logs into the CCS and forms a team of users to create intellectual property 1501. The intellectual property owner selects the preferred procedure to create the intellectual property 1502. The team executes the preferred procedure in the CCS to create the intellectual property 1503. The team creates meta data that will be encrypted with the intellectual property 1504. The CCS will encrypt this meta data after the intellectual property user sends their public encryption key to the intellectual property owner. The team also creates public meta data to attach to the intellectual property 1505. The public meta data can include an overview of the intellectual property and sales information for the intellectual property. The team specifies the terms and conditions to use the intellectual property 1506. The plurality of terms and conditions to use the intellectual property includes, but is not limited to, an owner-specified combination of the following; no conditions, the user's CCS login, the time of day, the number of prior uses by the user, the user's location, the user's device (e.g., MAC address), a channel parameter such as the social network used to login, and a biometric parameter such as a fingerprint. The team adds a sample of the intellectual property 1507. The team publishes the offer to sell the intellectual property 1508. The intellectual property user receives and reviews the offer to use the intellectual property, including reviewing the sample 1509. The intellectual property user pre-authorizes payment to use the intellectual property 1510. This is a pre-authorization pending final payment capture. This pre-authorization also triggers the CCS to send the intellectual property user's public encryption key to the intellectual property owner 1511. The CCS notifies the intellectual property owner of the pre-authorization to use the intellectual property 1512. The CCS front end application uses a first symmetric encryption key to encrypt the intellectual property and encrypt the product authorization ID. The intellectual property owner also adds a unique tag to that copy of the intellectual property to identify the user. The intellectual property owner uses this tag to identify this user as the source of any unauthorized copies of intellectual property 1513. The CCS front end application uses a second symmetric encryption key to encrypt the product authorization certificate 1514. The CCS front end application uses the intellectual property user's public encryption key to encrypt the first symmetric encryption key and the second symmetric encryption key 1515. The CCS decomposes the encrypted product authorization certificate 1516 (see FIG. 14). The CCS sends the encrypted intellectual property, tag and authorization ID to the intellectual property user 1517. The intellectual property user meets the terms of use for the intellectual property 1518. The CCS front end application uses the intellectual property user's private encryption key to decrypt the first symmetric encryption key and to decrypt the second symmetric encryption key 1519. The CCS front end application then uses the first symmetric encryption key to decrypt the authorization ID 1520. The intellectual property user uses the authorization ID to request the product authorization certificate 1521. The CCS uses the authorization identifier to retrieve the authorization certificate 1522. The CCS uses the authorization identifier to reconstruct the encrypted authorization certificate (see FIG. 14) 1523. The CCS front end application uses the second symmetric encryption key to decrypt the authorization certificate 1524. The intellectual property user initiates the final funds transfer to the intellectual property owner 1525. The CCS front end application then uses the first symmetric encryption key to decrypt the intellectual property 1526. The CCS closes the transaction.

The CCS 201 is operatively coupled to the Administrator Interface 202 which is the means for the system administrator to access the CCS. The CCS is operatively coupled to the Owner Interface 203 which is the means for an intellectual property owner to access the CCS. The CCS is operatively coupled to the User Interface 204 which is the means for an intellectual property user to access the CCS. The CCS is operatively coupled to the Authenticator Interface 205 which is the means for an authenticator user to access the CCS. The CCS is operatively coupled to the Service Provider Interface 206 which is the means for service providers, such as resellers of intellectual property, to access the CCS. Intellectual property owners can sell their intellectual property through resellers. The CCS is operatively coupled to the Data Storage System 207 that is the means to store the data used by the CCS. The CCS is operatively coupled to the Business Intelligence System 208 that is the means to generate trend information about intellectual property that can be sold to interested parties. For example, clients may be interested to know what type of intellectual property music or videos are being created and are being demanded to guide their future production decisions. The CCS is operatively coupled to the Notification Management System 209 that is the means to generate and send proactive and reactive notifications to users. For example, the CCS sends notifications to intellectual property users when intellectual property is offered that meets their stated preference that they have entered into their profile and can update on demand. The CCS also sends notifications to intellectual property owners when they receive a payment authorization from an intellectual property user. The CCS also sends notifications to intellectual property users when they receive intellectual property from an intellectual property owner. The CCS also sends notifications to intellectual property users when they receive intellectual property authentication from the Authentication System 211. The CCS also sends notifications to intellectual property owners when a payment is captured by the intellectual property user receiving the intellectual property or receiving the authentication. The CCS is operatively coupled to the Encryption System 210 that is the means to encrypt and decrypt intellectual property and symmetric encryption keys managed by the CCS. The CCS is operatively coupled to the Authentication System 211 that is the means to authenticate intellectual property to ensure the intellectual property user has a genuine right to use the intellectual property. The CCS is operatively coupled to the Payment Processor System System 212 that is the means to authorize and capture payments for the CCS. A pre-authorization is an interrogation of the user's account to ensure the user has the means to pay. A payment capture is the final transfer of the funds from the source account to the destination account. The CCS is operatively coupled to the Administration System 213 that is the means to administer the CCS. The system administrator user logs into the CCS and configures parameters such as pricing for licenses. The CCS, including its administration system, is the means to configure these parameters. The system administrator user also enhances the CCS as new features are requested by users and implemented by the system administrator. The CCS is created using standard programming languages such as java, javascript, PHP, HTML, C, C+, and visual basic which is the means to enhance the CCS. The CCS can be hosted by a web host such as Godaddy or Host Gator. These web hosts are the means for the system administrator to administer the CCS. The web hosts offer a plurality of services such as backing up the databases, managing content pages using tools like Wordpress, and providing forum services. For example, GoDaddy enables clients to add forums to their website that lets web visitors create discussions and post comments in discussion threads. The CCS is also the means for the system administrator to manage users who want to use the present invention and to manage trouble tickets that have been raised by users. The CCS is operatively coupled to the Workflow Management System 214 that is the means to manage the preferred procedure to create intellectual property in the CCS. The operators of the CCS have worked with many experts to determine the preferred procedure to create intellectual property, such as music and videos, and have incorporated this expertise into the steps, tasks, milestones, reports and deliverables that comprise the preferred procedure to create intellectual property in the CCS.

The present invention has a plurality of potential revenue streams including transaction fees, subscription fees, licensing fees, advertising, and the sale of trend information generated by the business intelligence system. Payments can be made using a plurality of methods including credit cards, debit cards, electronic funds transfer, digital cash, checks and barter. In addition, a plurality of options exist for the timing of payments including annual and monthly license payments in advance. It will be evident to one skilled in the art that one or more of the steps in the preferred procedure can be eliminated in specific situations without affecting the usefulness of the present invention.

Anyone skilled in the art will also recognize that the method and apparatus of the present invention has many applications and advantages, and that the present invention is not limited to the representative examples and variations disclosed herein. In addition, the scope of the present invention covers conventional variations and modifications, to the components of the present invention, which are known to those who are skilled in the art.

I claim:

1. A computer implemented method to manage a transfer of a digital medium from a first user to a second user using a secure communication protocol, comprising:

receiving, from said first user, said digital medium;

receiving, from said first user, a plurality of meta data including a plurality of terms and conditions to use said digital medium;

receiving, from said first user, an offer of sale for said digital medium;

receiving, from said second user, a payment pre-authorization in response to said offer of sale;

encrypting said digital medium, a secure authorization and an authorization identifier in response to said payment pre-authorization;

transferring, to said second user, said encrypted version of said digital medium and said encrypted version of said authorization identifier;

decrypting, for said second user, said authorization identifier;

decomposing said encrypted version of said secure authorization into a block of linked subcomponents;

selecting a first computer randomly, from a plurality of member computers, for each of a first block of member computers and a second block of member computers;

writing a first subcomponent and a second subcomponent, from said block of linked subcomponents, to said first computer and a second computer, respectively, in said first block of member computers, to create a first copy of said block of linked subcomponents, wherein said first computer in said first block of member computers selects said second computer in said first block of member computers randomly from said plurality of member computers;

writing, periodically, said first subcomponent and said second subcomponent, from said block of linked subcomponents, to said first computer and a second computer, respectively, in said second block of member computers, to create a newest copy of said block of linked subcomponents, wherein said first computer in said second block of member computers selects said second computer in said second block of member computers randomly from said plurality of member computers;

deleting an oldest copy of said block of linked subcomponents after said creation of said newest copy of said block of linked subcomponents;

reconstructing said encrypted version of said secure authorization from said newest copy of said block of linked subcomponents based on using said authorization identifier to request and retrieve said secure authorization;

decrypting, for said second user, said encrypted version of said secure authorization;

receiving from said second user, a payment for said digital medium based on said secure authorization and said payment pre-authorization;

decrypting, for said second user, said digital medium based on a decryption key received by the second user after said payment; and transmitting a non-confidential notification to a public email address of said second user, based on an event, including said payment from said second user, wherein a secure notification message associated with said event is transmitted, via a virtual private network, to a secure email address of said second user, whereby said encrypted version of said secure authorization moves dynamically and randomly among said plurality of member computers based on said creation of said newest copy of said block of linked subcomponents and said deletion of said oldest copy of said block of linked subcomponents.

2. The method according to claim 1, wherein said digital medium includes at least one of audio, video, music, information and data.

3. The method according to claim 1, wherein said offer of sale for said digital medium is comprised of a plurality of public data that includes at least one of an overview of said digital medium, a sample of said digital medium, said plurality of terms and conditions to use said digital medium and a plurality of sales information about said digital medium including a price.

4. The method according to claim 1, wherein:
said plurality of meta data includes a unique tag that associates said second user with said digital medium that is transferred to said second user.

5. The method according to claim 1, wherein said plurality of terms and conditions to use said digital medium includes at least one of no conditions, an identity of said second user, a time of day of use for said digital medium by said second user, a maximum number of uses by said second user, a location of use by said second user and an identifier for a device on which said second user can use said digital medium.

6. A system, comprised of multiple computers, for a first user to transfer a digital medium to a second user using a secure communication protocol, comprising:

at least one memory, on each of said multiple computers, configured to store computer program code instructions; and at least one processor, on each of said multiple computers, configured to execute said computer program code instructions to:

receive, from said first user, said digital medium;

receive, from said first user, a plurality of meta data including a plurality of terms and conditions to use said digital medium;

receive, from said first user, an offer of sale for said digital medium;

receive, from said second user, a payment pre-authorization in response to said offer of sale;

encrypt said digital medium, a secure authorization and an authorization identifier in response to said payment pre-authorization;

transfer, to said second user, said encrypted version of said digital medium and said encrypted version of said authorization identifier;

decrypt, for said second user, said authorization identifier;

decompose said encrypted version of said secure authorization into a block of linked subcomponents;

select a first computer randomly, from a plurality of member computers, for each of a first block of member computers and a second block of member computers, wherein the multiple computers of the system include the plurality of member computers;

write a first subcomponent and a second subcomponent, from said block of linked subcomponents, to said first computer and a second computer, respectively, in said first block of member computers, to create a first copy of said block of linked subcomponents, wherein said first computer in said first block of member computers selects said second computer in said first block of member computers randomly from said plurality of member computers;

write, periodically, said first subcomponent and said second subcomponent, from said block of linked subcomponents, respectively, to said first computer and a second computer, in said second block of member computers, to create a newest copy of said block of linked subcomponents, wherein said first computer in said second block of member computers selects said second computer in said second block of member computers randomly from said plurality of member computers;

delete an oldest copy of said block of linked subcomponents after said creation of said newest copy of said block of linked subcomponents;

reconstruct said encrypted version of said secure authorization from said newest copy of said block of linked subcomponents based on using said authorization identifier to request and retrieve said secure authorization;

decrypt, for said second user, said encrypted version of said secure authorization;

receive from said second user, a payment for said digital medium based on said secure authorization and said payment pre-authorization;

decrypt, for said second user, said digital medium based on said payment; and transmit a non-confidential notification to a public email address of said second user, based on an event, including said payment from said second user, and further transmit, to a secure email address of said second user, via a virtual private network, a secure notification message associated with said event, whereby said encrypted version of said secure authorization moves dynamically and randomly among said plurality of member computers based on said creation of said newest copy of said block of linked subcomponents and said deletion of said oldest copy of said block of linked subcomponents.

7. The system according to claim 6, wherein said digital medium includes at least one of audio, video, music, information and data.

8. The system according to claim 6, wherein said offer of sale for said digital medium is comprised of a plurality of public data that includes at least one of an overview of said digital medium, a sample of said digital medium, said plurality of terms and conditions to use said digital medium and a plurality of sales information about said digital medium including a price.

9. The system according to claim 6, wherein:
said plurality of meta data includes a unique tag that associates said second user with said digital medium that is transferred to said second user.

10. The system according to claim 6, wherein said plurality of terms and conditions to use said digital medium includes at least one of no conditions, an identity of said second user, a time of day of use for said digital medium by said second user, a maximum number of uses by said second user, a location of use by said second user and an identifier for a device on which said second user can use said digital medium.

11. At least one non-transitory computer storage medium each storing computer-executable instructions that, when executed by at least one processor operatively connected to the at least one non-transitory computer storage medium, cause the at least one processor to perform a computer-implemented method that enables a first user to transfer a digital medium to a second user using a secure communication protocol, said method comprising:

receiving, from said first user, said digital medium;

receiving, from said first user, a plurality of meta data including a plurality of terms and conditions to use said digital medium;

receiving, from said first user, an offer of sale for said digital medium;

receiving, from said second user, a payment pre-authorization in response to the offer of sale;

encrypting said digital medium, a secure authorization and an authorization identifier in response to said payment pre-authorization;

transferring, to said second user, said encrypted version of said digital medium and said encrypted version of said authorization identifier;

decrypting, for said second user, said authorization identifier;

decomposing said encrypted version of said secure authorization into a block of linked subcomponents;

selecting a first computer randomly, from a plurality of member computers, for each of a first block of member computers and a second block of member computers;

writing, a first subcomponent and a second subcomponent, from said block of linked subcomponents, to said first computer and a second computer, respectively, in said first block of member computers, to create a first copy of said block of linked subcomponents, wherein said first computer in said first block of member computers selects said second computer in said first block of member computers randomly from said plurality of member computers;

writing, periodically, said first subcomponent and said second subcomponent, from said block of linked subcomponents, to said first computer and a second computer, respectively, in said second block of member computers, to create a newest copy of said block of linked subcomponents, wherein said first computer in said second block of member computers selects said second computer in said second block of member computers randomly from said plurality of member computers;

deleting an oldest copy of said block of linked subcomponents after said creation of said newest block of linked subcomponents;

reconstructing said encrypted version of said secure authorization from said newest copy of said block of linked subcomponents based on using said authorization identifier to request and retrieve said secure authorization;

decrypting, for said second user, said encrypted version of said secure authorization;

receiving from said second user, a payment for said digital medium based on said secure authorization and said payment pre-authorization;

decrypting, for said second user, said digital medium based on said payment; and transmitting a non-confidential notification to a public email address of said second user, based on an event, including said payment from said second user, wherein a secure notification message associated with said event is transmitted, via a virtual private network, to a secure email address of said second user, whereby said encrypted version of said secure authorization moves dynamically and randomly among a plurality of member computers based on said creation of said newest copy of said block of linked subcomponents and said deletion of said oldest copy of said block of linked subcomponents.

12. The method according to claim 1, wherein:
encrypting said digital medium, further comprises encrypting said digital medium based on at least one of said second user's public cryptographic encryption key and a symmetric cryptographic encryption key;

decrypting said digital medium, further comprises decrypting said encrypted version of said digital medium based on at least one of said second user's private cryptographic encryption key and said symmetric cryptographic encryption key;

encrypting said secure authorization, further comprises encrypting said secure authorization based on at least one of said second user's public cryptographic encryption key and said symmetric cryptographic encryption key; and decrypting said secure authorization, further comprises decrypting said encrypted version of said secure authorization based on at least one of said second user's private cryptographic encryption key and said symmetric cryptographic encryption key, wherein said second user's private cryptographic encryption key matches said second user's public cryptographic encryption key.

13. The system according to claim 6, wherein said at least one processor is further configured to:

encrypt said digital medium based on at least one of said second user's public cryptographic encryption key and a symmetric cryptographic encryption key;

decrypt said digital medium based on at least one of said second user's private cryptographic encryption key and said symmetric cryptographic encryption key;

encrypt said secure authorization based on at least one of said second user's public cryptographic encryption key and said symmetric cryptographic encryption key; and decrypt said encrypted version of said secure authorization based on at least one of said second user's private cryptographic encryption key and said symmetric cryptographic encryption key, wherein said second user's private cryptographic encryption key matches said second user's public cryptographic encryption key.

14. The at least one non-transitory computer storage medium of claim 11, wherein:

encrypting said digital medium, further comprises encrypting said digital medium based on at least one of said second user's public cryptographic encryption key and a symmetric cryptographic encryption key;

decrypting said digital medium, further comprises decrypting said encrypted version of said digital medium based on at least one of said second user's private cryptographic encryption key and said symmetric cryptographic encryption key;

encrypting said secure authorization, further comprises encrypting said secure authorization based on at least one of said second user's public cryptographic encryption key and said symmetric cryptographic encryption key; and decrypting said secure authorization, further comprises decrypting said encrypted version of said secure authorization based on at least one of said second user's private cryptographic encryption key and said symmetric cryptographic encryption key, wherein said second user's private cryptographic encryption key matches said second user's public cryptographic encryption key.

15. The method according to claim 1, wherein said block of linked subcomponents includes at least 3 subcomponents, wherein at least two copies of said encrypted version of said secure authorization moves dynamically and randomly among said plurality of member computers.

16. The system according to claim 6, wherein said block of linked subcomponents includes at least 3 subcomponents, wherein at least two copies of said encrypted version of said secure authorization moves dynamically and randomly among said plurality of member computers.

17. The at least one non-transitory computer storage medium of claim 11, wherein said block of linked subcomponents includes at least 3 subcomponents, wherein at least two copies of said encrypted version of said secure authorization moves dynamically and randomly among said plurality of member computers.

* * * * *